(12) United States Patent
McIntosh

(10) Patent No.: US 9,415,873 B2
(45) Date of Patent: Aug. 16, 2016

(54) WASTE DISPOSAL SYSTEM FOR AIRCRAFT

(71) Applicant: The Boeing Company, Chicago, IL (US)

(72) Inventor: Darren Carl McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 178 days.

(21) Appl. No.: 14/158,107

(22) Filed: Jan. 17, 2014

(65) Prior Publication Data

US 2015/0203203 A1 Jul. 23, 2015

(51) Int. Cl.
*B64D 11/04* (2006.01)
*B64C 1/10* (2006.01)

(52) U.S. Cl.
CPC .. *B64D 11/04* (2013.01); *B64C 1/10* (2013.01)

(58) Field of Classification Search
CPC .............................. B64D 11/00; B64D 11/04
USPC .......................................... 232/43.2, 43.3, 47
See application file for complete search history.

(56) References Cited

U.S. PATENT DOCUMENTS

| | | | | |
|---|---|---|---|---|
| 2,690,870 A * | 10/1954 | Harman | ................. | A47B 79/00 232/4 D |
| 2,792,171 A * | 5/1957 | Rosset | ................. | B65F 1/0093 232/43.3 |
| 3,866,861 A * | 2/1975 | Ratcliff | ................. | B64D 11/00 220/908 |
| 3,908,538 A * | 9/1975 | Boyd | ................. | B30B 9/3078 100/137 |
| 4,055,317 A * | 10/1977 | Greiss | ................. | B64D 11/00 244/118.5 |
| 4,776,903 A * | 10/1988 | Nordskog | ................. | B64D 11/04 156/153 |
| 4,893,722 A * | 1/1990 | Jones | ................. | B65F 1/006 220/23.83 |
| 5,465,660 A * | 11/1995 | Conti | ................. | B30B 9/3003 100/100 |
| 5,758,819 A * | 6/1998 | Sniegocki | ................. | B65F 1/10 109/46 |
| 5,890,439 A * | 4/1999 | McGunn | ................. | E05G 1/005 109/46 |
| 6,138,558 A * | 10/2000 | Harrington | ................. | B30B 9/323 100/102 |
| 7,089,852 B2 * | 8/2006 | Iacobucci | ................. | B30B 9/3064 100/100 |
| 8,122,823 B2 * | 2/2012 | Cunningham | ................. | B30B 9/301 100/215 |
| 8,776,680 B2 * | 7/2014 | Zimmerman, II | ................. | B30B 9/321 100/215 |
| 8,967,040 B2 * | 3/2015 | Fritz | ................. | B30B 9/3007 100/100 |
| 9,085,118 B2 * | 7/2015 | Iacobucci | ................. | B30B 9/3021 |
| 2007/0273257 A1 * | 11/2007 | Hui | ................. | B65F 1/1442 312/274 |
| 2013/0187000 A1 | 7/2013 | Godecker et al. | | |
| 2013/0269545 A1 | 10/2013 | Cunningham et al. | | |

* cited by examiner

*Primary Examiner* — Brian M O'Hara
*Assistant Examiner* — Michael Kreiner
(74) *Attorney, Agent, or Firm* — Yee & Associates, P.C.

(57) ABSTRACT

A method and apparatus for disposing of waste in an aircraft. An apparatus comprises a receptacle system. The receptacle system is configured to hold the waste. The receptacle system is located in a space between a galley and a bulkhead of the aircraft.

16 Claims, 28 Drawing Sheets

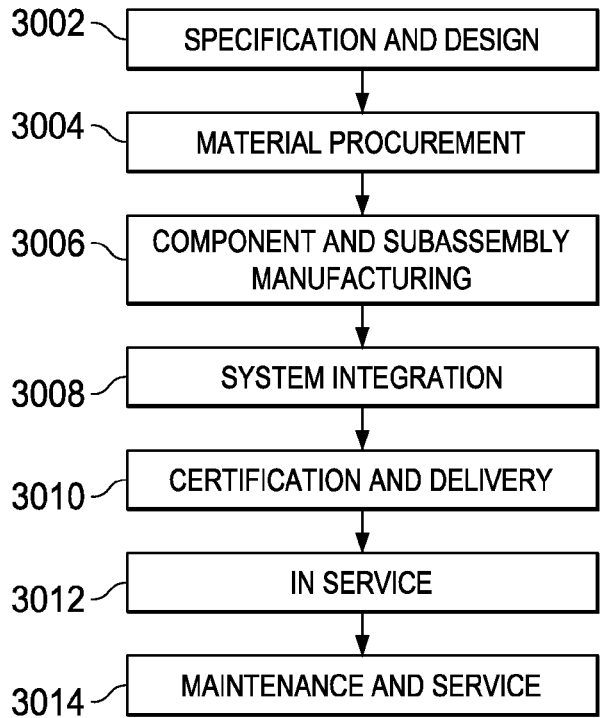
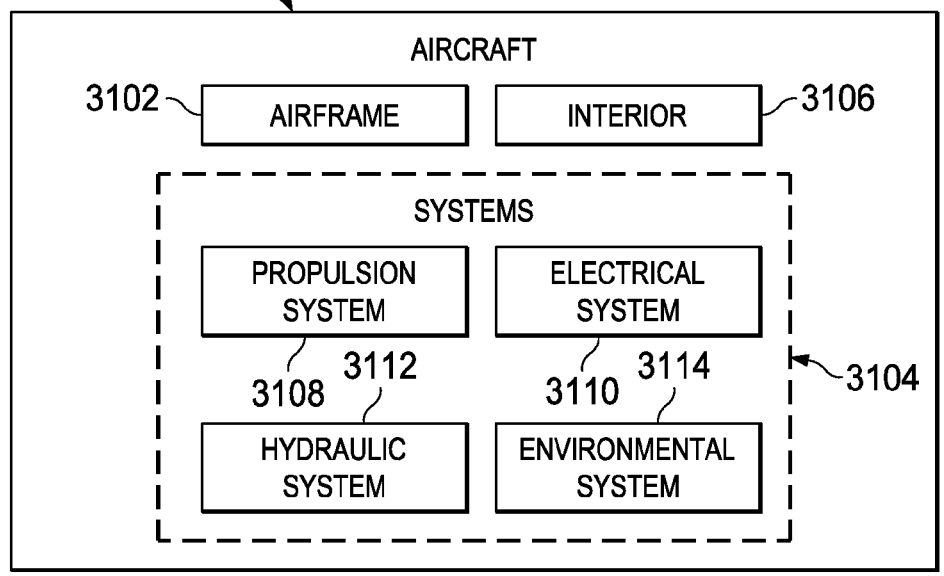

WASTE DISPOSAL SYSTEM FOR AIRCRAFT

BACKGROUND INFORMATION

1. Field

The present disclosure relates generally to aircraft and, in particular, to storage systems for aircraft. Still more particularly, the present disclosure relates to a method and apparatus for storing waste in an aircraft.

2. Background

In operating a passenger aircraft, airlines strive to improve the passenger experience. One way to improve the passenger experience is to provide food service, beverage service, or both on the aircraft. When food and beverage services are provided, aircraft are often equipped with a galley.

An aircraft galley is an area of the passenger cabin of the aircraft that is used to store, prepare, and dispose items for food and beverage service to passengers. A number of galleys may be located throughout the passenger cabin. One of these galleys is typically located in the aft section of the fuselage of the aircraft. When two or more galleys are present in the aircraft, a flight crew may use one galley to prepare food and beverage items for first class passengers, while another galley is used to prepare food and beverage items for other passengers.

The galley of the aircraft includes various types of equipment for the storage, preparation, and disposal of food and beverage items. For example, the galley of the aircraft may include beverage dispensers, service carts, waste storage compartments, trash compactors, food and beverage storage compartments, refrigeration units, and other suitable types of equipment.

Space on an aircraft is valuable. The amount of space in an aircraft varies depending on the size of the aircraft. As a result, incorporating the needed equipment to provide food and beverage service to passengers may be more difficult than desired in some aircraft.

In aircraft with small galleys, some equipment may be reduced in size or eliminated due to space constraints. For instance, larger passenger aircraft may have a galley equipped with ten food and beverage storage compartments and a trash compactor, while a smaller aircraft may have space for only two food and beverage storage compartments and a waste storage compartment. In other words, as the size of the aircraft becomes smaller, the capability to store, prepare, and dispose of food and beverage products is reduced. The reduction in this capability may be greater than the reduction in the number of passengers. Accordingly, providing services to passengers may be more difficult than desired.

Even in aircraft with larger galleys, galley equipment may not be configured in an efficient manner. For instance, in some cases, waste disposal compartments are located in the lower half of the galley, resulting in flight crew having to bend down to transfer items from the galley counter into the waste disposal compartment.

In other instances, these waste storage compartments may be smaller than desired. For example, as more and more passengers bring their own food and beverage items onto the aircraft, waste disposal compartments may not be able to hold as much waste as desired.

These waste storage compartments also may be inaccessible during various stages of operation. As a result, flight crew have to sort and transfer waste into the waste storage compartments between flights. Sorting and transferring waste between flights may increase the time spent at the gate more than preferred. Therefore, it would be desirable to have a method and apparatus that take into account at least some of the issues discussed above, as well as other possible issues.

SUMMARY

In one illustrative embodiment, an apparatus comprises a receptacle system. The receptacle system is configured to hold waste. The receptacle system is located in a space between a galley and a bulkhead of an aircraft.

In another illustrative embodiment, a method for disposing of waste in an aircraft is presented. The waste is received in a compartment associated with a galley structure. The waste is moved into a receptacle system located in a space between a galley and a bulkhead of the aircraft.

In yet another illustrative embodiment, an aircraft comprises a galley in an aft section of a fuselage of the aircraft and a waste disposal system associated with the galley. The waste disposal system comprises a receptacle system having a group of bins configured to hold waste and a drawer system associated with a galley structure and in communication with the receptacle system. The receptacle system is located in a space between the galley and an aft pressure bulkhead of the fuselage of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 30 is an illustration of an aircraft manufacturing and service method in the form of a block diagram in accordance with an illustrative embodiment; and FIG. 31 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that improving the passenger experience on aircraft involves adding features to the galley. As a result, some galley equipment may need to be reduced in size to accommodate these new features or additional space needs to be allocated to enlarge the galley. The illustrative embodiments recognize and take into account, however, that enlarging the galley is undesirable since a larger galley may result in decreased passenger seating.

The illustrative embodiments also recognize and take into account that it is desirable to increase the storage capacity of a waste storage compartment for disposing of food and beverage items. As more and more passengers bring food and beverage items onto the aircraft, more waste is produced and the waste storage needs of the aircraft are increased.

The illustrative embodiments recognize and take into account, however, that some currently used waste disposal systems have a limited storage capacity. This storage capacity is limited due to limited space in the galley of the aircraft. For example, some currently used waste storage compartments on commercial aircraft may be configured to hold about one cubic foot of waste each.

Additionally, the illustrative embodiments recognize and take into account that it is desirable to position the waste storage compartment in an area in the galley that is accessible during various stages of operation.

Thus, the illustrative embodiments provide a method and apparatus for disposing of waste in an aircraft. An apparatus comprises a receptacle system configured to hold waste. The receptacle system is located in a space between a galley and a bulkhead of an aircraft. In other embodiments, the apparatus also includes a drawer system. The drawer system is associated with a galley structure and is in communication with the receptacle system. The drawer system is configured to receive the waste and move the waste into the receptacle system.

Figure 1:
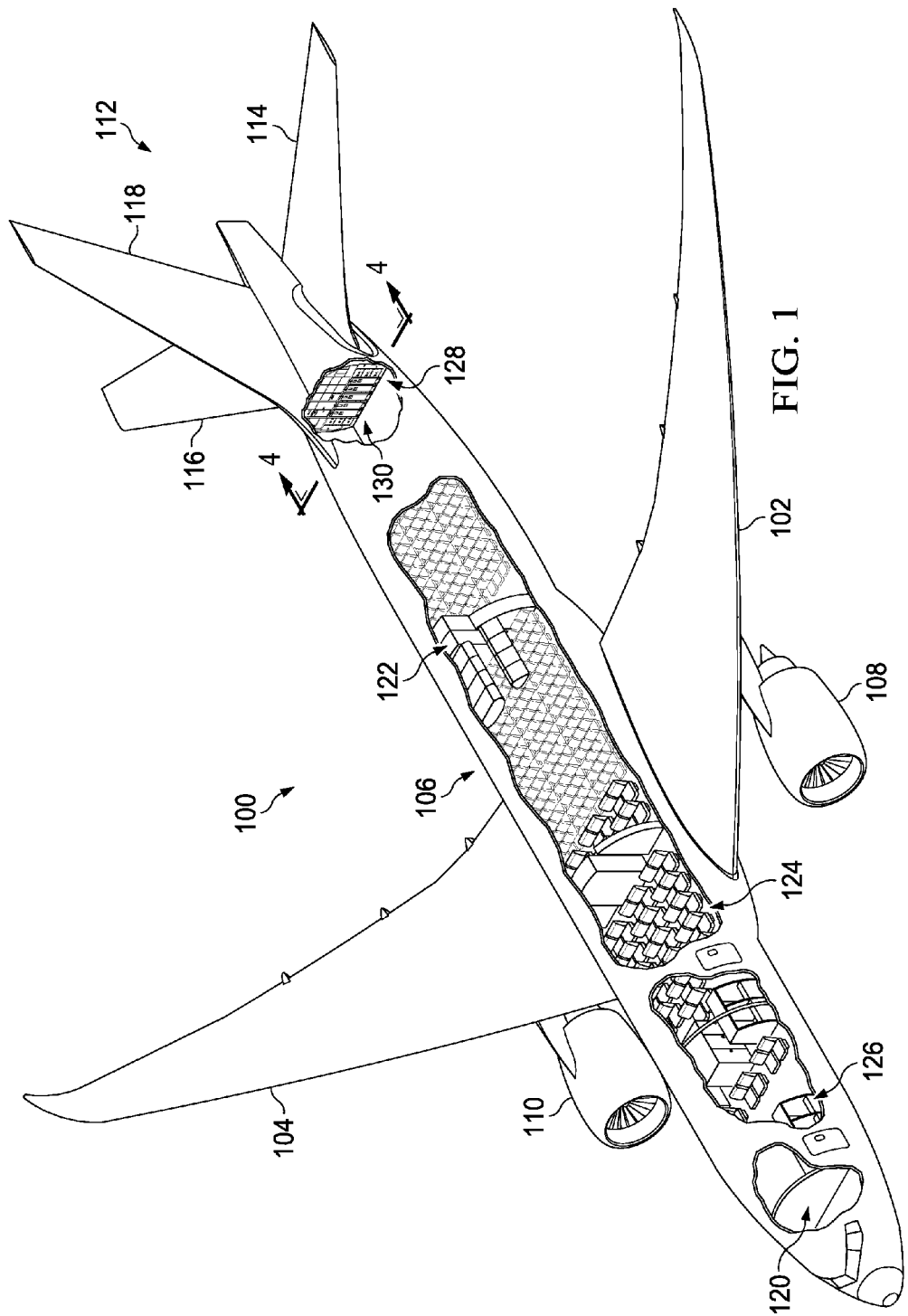
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has aft section 112. Aft section 112 is the tail section of fuselage 106 in this illustrative example. Horizontal stabilizer 114, horizontal stabilizer 116, and vertical stabilizer 118 are attached to aft section 112 of fuselage 106.

Fuselage 106 also has cockpit 120 and passenger cabin 122. In this example, passenger cabin 122 may include passenger seating in seating area 124. Seating area 124 may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. In this illustrative example, passenger cabin 122 also may include lavatory 126 and galley area 128. These two areas may be partitioned or separated from seating area 124 by a partitioning structure such as, for example, without limitation, a bulkhead.

As depicted, galley area 128 is in aft section 112 of fuselage 106. Galley area 128 includes galley 130 in this illustrative example.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented.

For example, aircraft 100 is shown as a commercial passenger aircraft. The different illustrative embodiments may be applied to other types of aircraft such as private passenger aircraft, and other suitable types of aircraft. Also, other areas may be present in addition to seating area 124, lavatory 126, and galley area 128.

Other areas may include, for example, without limitation, closets, storage areas, lounges, and other suitable areas for passenger seating. As another example, airplane seats within seating area 124 may be arranged differently from the depicted example. In other illustrative embodiments, some seats may be grouped into sets of single seats instead of three seats or pairs of seats as is illustrated in seating area 124. Some seats in seating area 124 may be grouped in a single aisle configuration, a twin aisle configuration, or a combination thereof.

In still other illustrative examples, additional galley areas are present in aircraft 100. For example, an additional galley area may be present for first class passengers in the forward section of fuselage 106.

Figure 2:
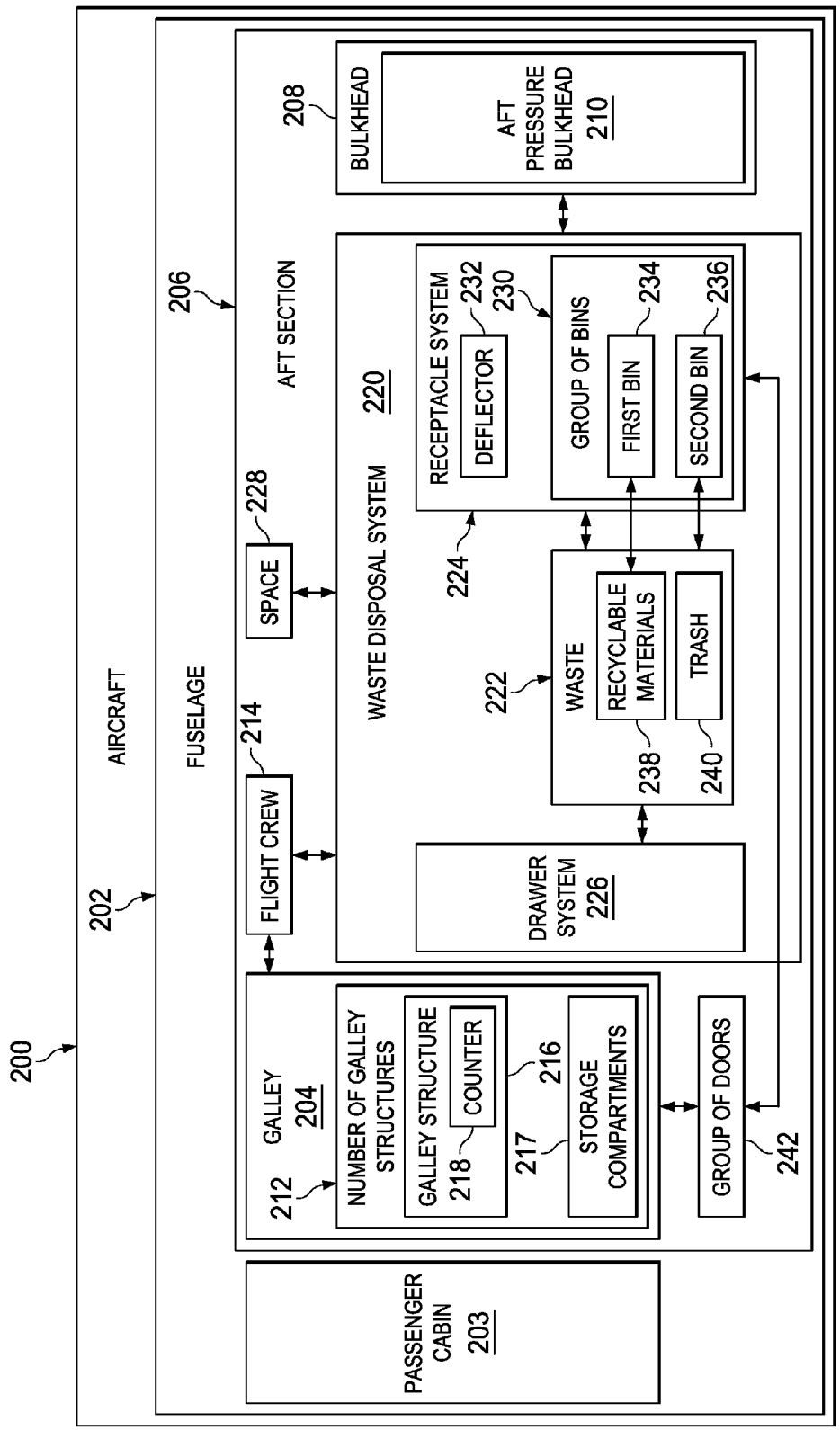
FIG. 2 is an illustration of a block diagram of an aircraft with a waste disposal system in accordance with an illustrative embodiment.

With reference next to FIG. 2, an illustration of a block diagram of an aircraft with a waste disposal system is depicted in accordance with an illustrative embodiment. In this depicted example, aircraft 100 in FIG. 1 is an example of a physical implementation for aircraft 200 shown in block form in this figure.

As depicted, aircraft 200 includes fuselage 202. Fuselage 202 is the main body section of aircraft 200. Fuselage 202 has passenger cabin 203. Passenger cabin 203 is a pressurized portion of fuselage 202 and is configured to hold passengers and crew in aircraft 200. Passenger cabin 203 includes galley 204 in this illustrative example.

As illustrated, galley 204 is located in aft section 206 of fuselage 202 of aircraft 200. Galley 204 is a portion of passenger cabin 203 where food items, beverage items, or both are stored, prepared, disposed of, or some combination thereof. Aft section 206 of fuselage 202 is the rear portion of fuselage 202.

In this illustrative example, bulkhead 208 is located in aft section 206 of fuselage 202. Bulkhead 208 is located behind galley 204. In the illustrative example, bulkhead 208 is an upright structure. In particular, bulkhead 208 is an upright wall within aircraft 200. Bulkhead 208 functions as a partition between areas in aircraft 200.

In this depicted example, bulkhead 208 is aft pressure bulkhead 210 of fuselage 202 of aircraft 200. Aft pressure bulkhead 210 is the rearmost partition of pressurized passenger cabin 203 of fuselage 202. Aft pressure bulkhead 210 is configured to separate the rear of passenger cabin 203 and unpressurized portions of the fuselage.

As depicted, galley 204 includes number of galley structures 212. Number of galley structures 212 includes components used by flight crew 214 to store, prepare, dispose of, or some combination thereof, food and beverage items in passenger cabin 203. Number of galley structures 212 is arranged within galley 204 such that flight crew 214 has access to number of galley structures 212 during various stages of operation.

In this depicted example, number of galley structures 212 comprises galley structure 216 and storage compartments 217. Galley structure 216 takes a number of different forms in this illustrative example. For instance, galley structure 216 may be selected from one of a counter, a cabinet, a refrigeration unit, a food and beverage cart, a beverage dispenser, and other suitable types of galley structures.

Galley structure 216 takes the form of counter 218 in this illustrative example. Counter 218 is a horizontal work surface in galley 204. Flight crew 214 may use counter 218 to prepare food and beverage items in galley 204.

In this illustrative example, storage compartments 217 are arranged in galley 204. Storage compartments 217 are containers configured to hold items used by flight crew 214. Storage compartments 217 take various forms in this illustrative example. For instance, storage compartments 217 may take the form of a drawer, a bin, a drum, a canister, a box, a caddy, a crate, or other suitable types of storage compartments.

In this depicted example, waste disposal system 220 is located in aft section 206 of fuselage 202. Waste disposal system 220 is physically associated with galley 204 in this illustrative example.

As used herein, a first component, such as waste disposal system 220, may be considered to be associated with a second component, such as galley 204, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second components, as an extension of the second component, or both.

Waste disposal system 220 is configured to hold waste 222. Waste 222 comprises substances or items intended to be discarded. Waste 222 may be selected from at least one of trash, recyclable materials, liquid waste, hazardous materials, or some other suitable type of waste. Waste disposal system 220 is used to store waste 222 until waste 222 can be removed from aircraft 200 in a desired manner.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this depicted example, waste disposal system 220 comprises receptacle system 224 and drawer system 226. Receptacle system 224 is configured to hold waste 222 in this illustrative example.

Receptacle system 224 is located in space 228 between galley 204 and bulkhead 208 of aircraft 200 in this illustrative example. Space 228 may be empty space, or "dead space," in aircraft 200. In other words, space 228 between galley 204 and bulkhead 208 may be space that is not currently used for aircraft components or storage in aircraft 200. Space 228 is pressurized in this illustrative example.

As depicted, receptacle system 224 comprises group of bins 230 and deflector 232. A "group of" items is one or more items in this illustrative example. For example, group of bins 230 includes one or more bins.

In this depicted example, group of bins 230 are configured to hold waste 222. Group of bins 230 may be comprised of various types of materials. For instance, group of bins 230 may be comprised of a material selected from one of a metal, a metal alloy, a plastic, a composite material, or some other suitable type of material.

In this illustrative example, group of bins 230 are rigid structures. In other illustrative examples, group of bins 230 may take the form of a flexible structure such as a bag or other suitable flexible structure.

Each of group of bins 230 may be positioned relative to one another in space 228 between galley 204 and bulkhead 208 in this illustrative example. For example, first bin 234 and second bin 236 in group of bins 230 may be positioned next to one another in space 228. In another example, first bin 234 may be positioned on top of second bin 236. In this case, second bin 236 may be used to dispose of waste 222 when first bin 234 is full. For example, first bin 234 may release waste 222 into second bin 236 when first bin 234 is full.

First bin 234 and second bin 236 may be the same size in this illustrative example. In other illustrative examples, first bin 234 and second bin 236 may be different sizes.

As depicted, each of group of bins 230 may be configured to hold the same type of waste 222 or a different type of waste 222. For example, both first bin 234 and second bin 236 may hold the same type of waste 222. In another illustrative example, first bin 234 may be configured to hold recyclable materials 238, while second bin 236 may be configured to hold trash 240.

In this illustrative example, recyclable materials 238 are items intended to be used to make new products. Recyclable materials 238 may include, for example, without limitation, glass, paper, metal, plastic, textiles, and other suitable types of materials that can be recycled. Trash 240 includes other unwanted items other than recyclable materials 238.

As illustrated, deflector 232 is associated with group of bins 230. Deflector 232 is configured to direct waste 222 into group of bins 230 in receptacle system 224 in this illustrative example.

In this depicted example, deflector 232 is positioned above group of bins 230 such that waste 222 is directed into group of bins 230 when received by receptacle system 224. For example, when first bin 234 and second bin 236 are positioned adjacent to one another in space 228, deflector 232 may be a triangular component positioned above first bin 234 and second bin 236 such that waste 222 moving into receptacle system 224 is directed into both bins. In this case, deflector 232 may be positioned on top of a structural component that separates first bin 234 and second bin 236.

In another illustrative example, when only first bin 234 is present in group of bins 230, deflector 232 is positioned above first bin 234 such that waste 222 is more easily directed into first bin 234. In this case, deflector 232 for first bin 234 directs waste 222 into first bin 234 when drawer system 226 is not located directly above first bin 234. For instance, drawer system 226 may be located to the side of first bin 234 or offset from first bin 234 in some other manner.

In this illustrative example, flight crew 214 uses drawer system 226 to move recyclable materials 238, trash 240, or both into group of bins 230. Drawer system 226 may be positioned within galley 204 with respect to storage compartments 217.

Receptacle system 224, drawer system 226, or both may be positioned in a number of different ways with respect to galley 204. In this illustrative example, drawer system 226 is centered in galley 204 with receptacle system 224 located in the center portion of space 228 between galley 204 and bulkhead 208. Receptacle system 224, drawer system 226, or both may have a different configuration in other illustrative examples.

Drawer system 226 is physically associated with galley structure 216 in this illustrative example. For example, drawer system 226 may move above counter 218 in galley 204. In this case, drawer system 226 may slide back and forth such that flight crew 214 may place waste 222 in drawer system 226.

As depicted, drawer system 226 is in communication with receptacle system 224. Drawer system 226 is configured to receive waste 222 and move waste 222 into receptacle system 224 in this illustrative example. For example, waste 222 received by drawer system 226 is moved into group of bins 230 for storage until waste 222 is removed from aircraft 200.

Waste 222 may be moved from drawer system 226 into receptacle system 224 in a number of different ways. In an illustrative example, drawer system 226 includes a mechanical component configured to drop waste 222 into receptacle system 224. In another illustrative example, a conveyor system located within drawer system 226 moves waste 222 into receptacle system 224. In still another illustrative example, drawer system 226 opens and waste 222 is delivered directly to receptacle system 224 or in some other manner, depending on the functionality involved.

In this illustrative example, group of doors 242 are located below galley structure 216. Group of doors 242 are configured to open to provide access to receptacle system 224. For instance, group of doors 242 may be opened and group of bins 230 may be pulled out and emptied. In this manner, waste 222 is removed from aircraft 200.

Receptacle system 224 positioned in space 228 between galley 204 and bulkhead 208 provides for more space in galley 204 to be used for other items. Additionally, since space 228 is not currently used for aircraft components, group of bins 230 in receptacle system 224 may be larger than some currently used systems.

Drawer system 226 associated with galley structure 216 also provides a more efficient way to dispose of waste 222 than with waste storage compartments located in the lower portion of galley 204. When drawer system 226 is located on counter 218, flight crew 214 may place waste 222 in drawer system 226 on counter 218 without bending down. Drawer system 226 also may be accessed during various stages of operation of aircraft 200. As a result, waste 222 may be disposed of throughout flight of aircraft 200.

Figure 3:
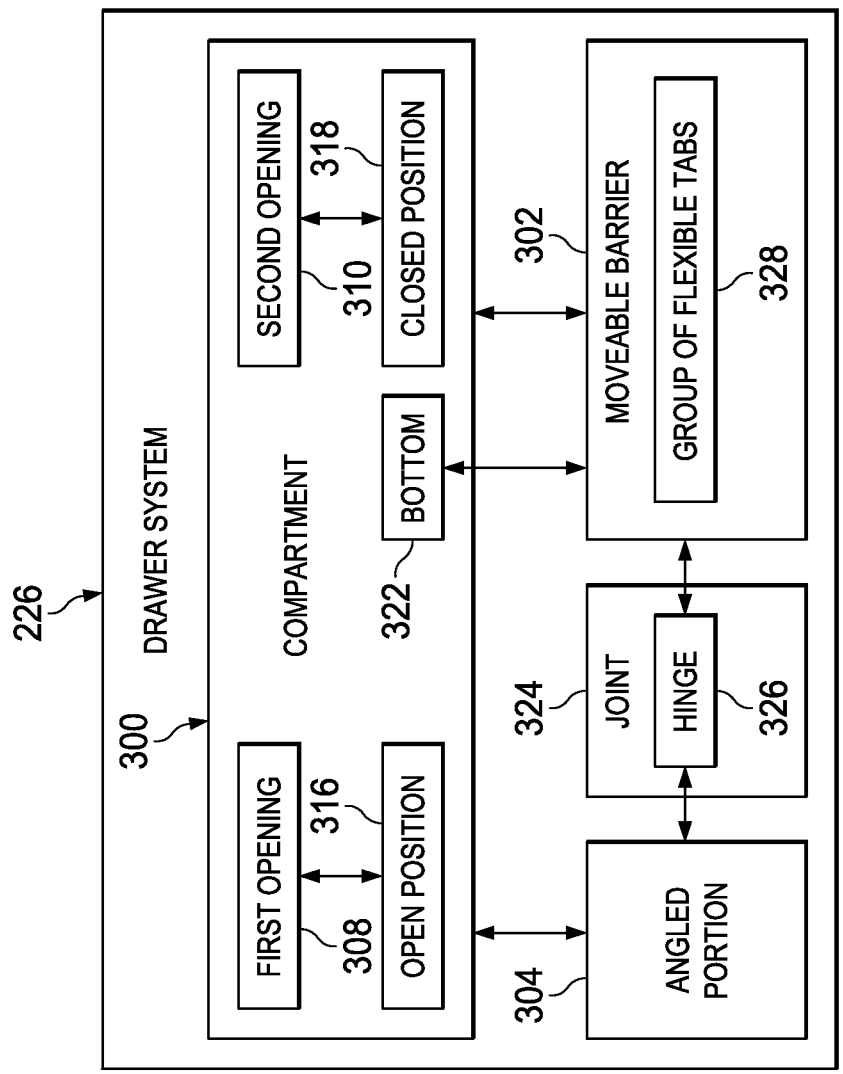
FIG. 3 is an illustration of a block diagram of a drawer system in accordance with an illustrative embodiment.

Turning now to FIG. 3, an illustration of a block diagram of a drawer system is depicted in accordance with an illustrative embodiment. In this depicted example, the components within drawer system 226 from FIG. 2 are shown.

As illustrated, drawer system 226 comprises compartment 300, moveable barrier 302, and angled portion 304. In this illustrative example, compartment 300 is associated with galley structure 216 in FIG. 2. Flight crew 214 may place waste 222 in FIG. 2 in compartment 300.

In this depicted example, compartment 300 has first opening 308 and second opening 310. First opening 308 of compartment 300 is configured to receive waste 222, while second opening 310 of compartment 300 is configured to move waste 222 into receptacle system 224 in FIG. 2 in this illustrative example.

As depicted, first opening 308 is accessed in a number of different ways. In an illustrative example, compartment 300 includes a door configured to open to expose first opening 308. In another illustrative example, compartment 300 is a drawer configured to slide above counter 218 in FIG. 2 to expose first opening 308.

In this illustrative example, compartment 300 is moveable within galley structure 216 between open position 316 and closed position 318. In this depicted example, waste 222 is received in compartment 300 through first opening 308 when compartment 300 is in open position 316. Waste 222 may then move through second opening 310 into receptacle system 224 when compartment 300 is in closed position 318.

In this illustrative example, moveable barrier 302 is located in bottom 322 of compartment 300 of drawer system 226. Moveable barrier 302 is configured to move to expose second opening 310 in compartment 300.

In this depicted example, moveable barrier 302 may take various forms. For example, moveable barrier 302 may take the form of one of a trap door, an iris, a hatch, a sliding door, or some other suitable type of moveable barrier.

As depicted, moveable barrier 302 and angled portion 304 are connected at joint 324. Joint 324 is configured to allow movement of at least one of moveable barrier 302 or angled portion 304.

In this depicted example, joint 324 comprises hinge 326. Hinge 326 is configured to move such that moveable barrier 302 moves relative to angled portion 304. Hinge 326 may take a number of different forms in this illustrative example. For instance, hinge 326 may be selected from one of a piano hinge, a pivot hinge, a barrel hinge, a butt hinge, a butterfly hinge, a flush hinge, or some other type of hinge in this illustrative example.

As depicted, moveable barrier 302 moves to expose second opening 310 when compartment 300 is in closed position 318. Moveable barrier 302 is configured to move downward to expose second opening 310 such that waste 222 moves from compartment 300 through second opening 310 into receptacle system 224. Moveable barrier 302 moves to cover second opening 310 when compartment 300 is in open position 316. In this manner, moveable barrier 302 is a trap door in drawer system 226.

As illustrated, moveable barrier 302 comprises group of flexible tabs 328. Group of flexible tabs 328 are configured to be positioned above receptacle system 224 when compartment 300 is in closed position 318 in this illustrative example.

Group of flexible tabs 328 may be comprised of a number of different materials in this illustrative example. For instance, group of flexible tabs 328 may be comprised of a material selected from at least one of a rubber, a plastic, a polycarbonate, a composite material, a close cell foam, a metal, a metal alloy, leather, silica fiber, woven carbon fiber, woven fiberglass, biaxially-oriented polyethylene terephthalate, polyethylene, other suitable types of materials, or combinations of materials.

In this depicted example, group of flexible tabs 328 are connected to moveable barrier 302. In an illustrative example, group of flexible tabs 328 are fastened to moveable barrier 302 on three sides of each of group of flexible tabs 328. In other illustrative examples, each of group of flexible tabs 328 are connected to moveable barrier 302 in some other manner, depending on the particular implementation.

In this illustrative example, group of flexible tabs 328 are positioned above deflector 232 in FIG. 2 when compartment 300 is in closed position 318. Group of flexible tabs 328 are configured to move such that moveable barrier 302 exposes second opening 310. For example, group of flexible tabs 328 open when moveable barrier 302 contacts deflector 232 when compartment 300 is in closed position 318.

As each of group of flexible tabs 328 opens, gravity forces the rest of moveable barrier 302 to move to expose second opening 310. When compartment 300 is moved to open position 316, group of flexible tabs 328 are closed and moveable barrier 302 is moved to cover second opening 310 in this illustrative example.

In this depicted example, angled portion 304 of drawer system 226 is configured to move waste 222 toward moveable barrier 302. In this illustrative example, angled portion 304 is configured to move waste 222 toward moveable barrier 302 such that waste 222 is received in compartment 300 through first opening 308 and is moved through second opening 310 into receptacle system 224 when moveable barrier 302 moves to expose second opening 310.

Waste 222 received in compartment 300 may be moved through compartment 300 and into receptacle system 224 as moveable barrier 302 exposes second opening 310 in compartment 300. In this manner, drawer system 226 provides a waste chute for waste 222 in aircraft 200.

The illustrations of waste disposal system 220 and the components associated with waste disposal system 220 in FIG. 2 and FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, galley 204 may be located in another section of fuselage 202 other than aft section 206 in FIG. 2. In another illustrative example, more than one galley may be present in aircraft 200. In still other examples, hinge 326 may be replaced with another type of device connected to angled portion 304 and moveable barrier 302 that allows moveable barrier 302 to open and close to expose second opening 310.

In yet another illustrative example, drawer system 226 may include more than one compartment. In this case, each compartment may be configured to receive a different type of waste 222. For example, a first compartment may be configured to receive recyclable materials 238, while a second compartment may be configured to receive trash 240.

In still other illustrative examples, receptacle system 224 includes a movement system configured to move group of bins 230 from within receptacle system 224 to be accessed by flight crew 214. For instance, receptacle system 224 may include rails such that group of bins 230 slide along the rails as group of doors 242 under counter 218 are opened.

In another illustrative example, drawer system 226 may not be centered within galley 204. Instead, drawer system 226 may be offset from the center of galley 204. In this case, receptacle system 224 is offset from the center portion of space 228. In this instance, group of doors 242 are located such that each of group of bins 230 in receptacle system 224 may be accessed.

Figure 4:
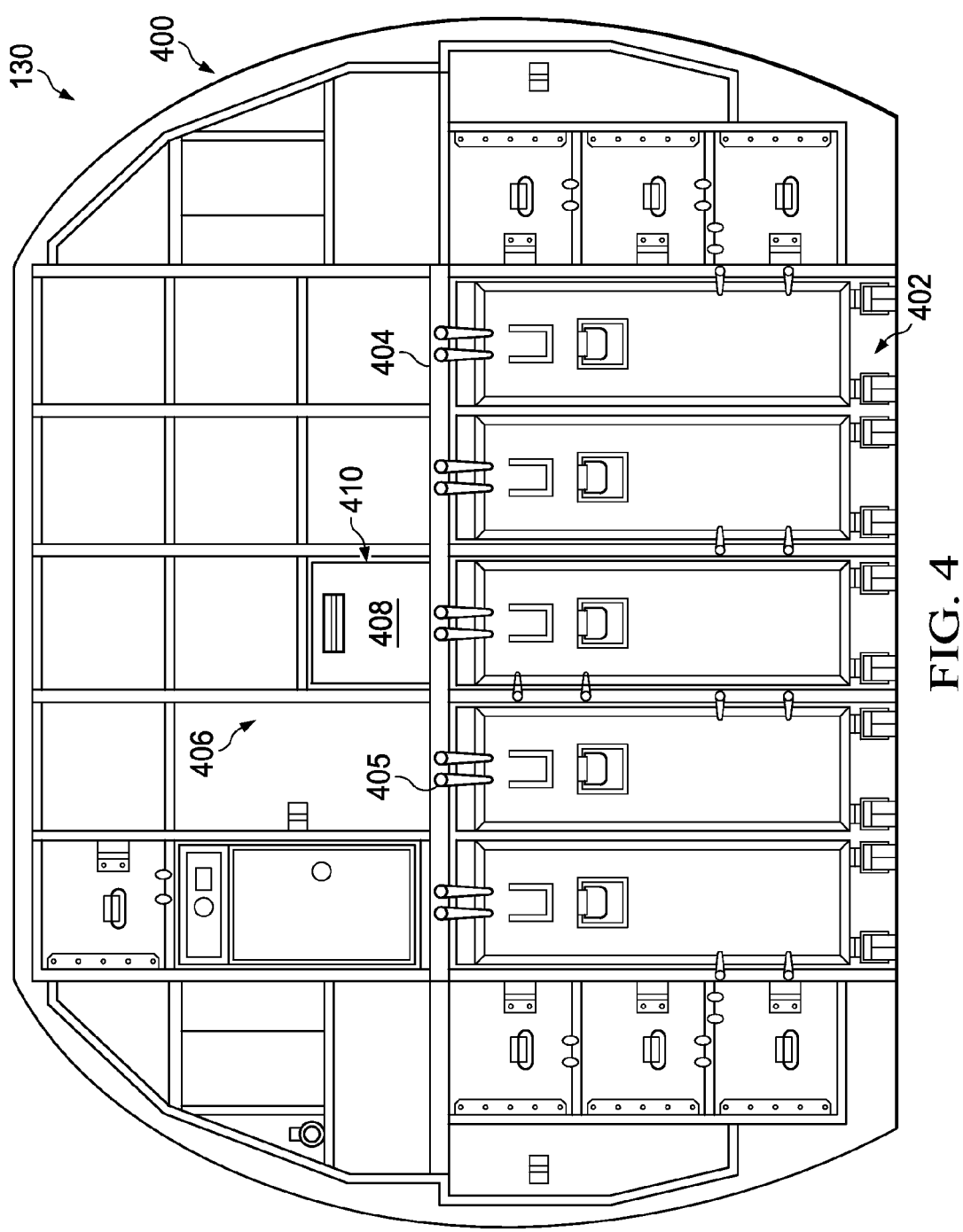
FIG. 4 is an illustration of a galley of an aircraft in accordance with an illustrative embodiment.

With reference now to FIG. 4, an illustration of a galley of an aircraft is depicted in accordance with an illustrative embodiment. In this depicted example, galley 130 in galley area 128 of aircraft 100 from FIG. 1 is shown in greater detail. A front view of galley 130 in FIG. 1 is seen in the direction of lines 4-4 in FIG. 1.

As depicted, galley 130 includes storage compartments 400, carts 402, and counter 404. Storage compartments 400 are arranged within galley 130 and are configured to store items within galley 130. Storage compartments 400 have various shapes and sizes in this illustrative example.

In some illustrative examples storage compartments 400 are removable and may be replaced with other types of components used in galley 130. For instance, a number of storage compartments 400 may be replaced with components such as ovens, beverage dispensers, and other suitable components for use in galley 130.

Carts 402 are food and beverage carts in this illustrative example. In other illustrative examples, carts 402 may hold other items. Carts 402 are stored under counter 404 and secured using latches 405. Carts 402 are configured to move within passenger cabin 122 in FIG. 1. For example, flight crew move carts 402 down an aisle in seating area 124 in FIG. 1 to serve food and beverages to passengers, collect waste from passengers, or both. Carts 402 are equipped with wheels in this illustrative example. In other illustrative example, another type of movement system may be used to move carts 402 within passenger cabin 122.

As depicted, waste disposal system 406 is associated with galley 130. In this illustrative example, drawer system 408 in waste disposal system 406 is associated with counter 404 of galley 130.

Drawer system 408 includes compartment 410 in this illustrative example. Compartment 410 slides back and forth above counter 404 such that waste may be placed in compartment 410. For example, a movement system may be installed in drawer system 408 for compartment 410 such that compartment 410 may slide back and forth above counter 404. In this case, the movement system may include drawer runners installed along the sides of compartment 410 and corresponding side walls of galley 130 surrounding compartment 410.

As illustrated, compartment 410 has been installed in galley 130 in place of one of storage compartments 400. In this illustrative example, compartment 410 has a standard size such that compartment 410 may replace one of storage compartments 400 without substantial rework.

Figure 5:
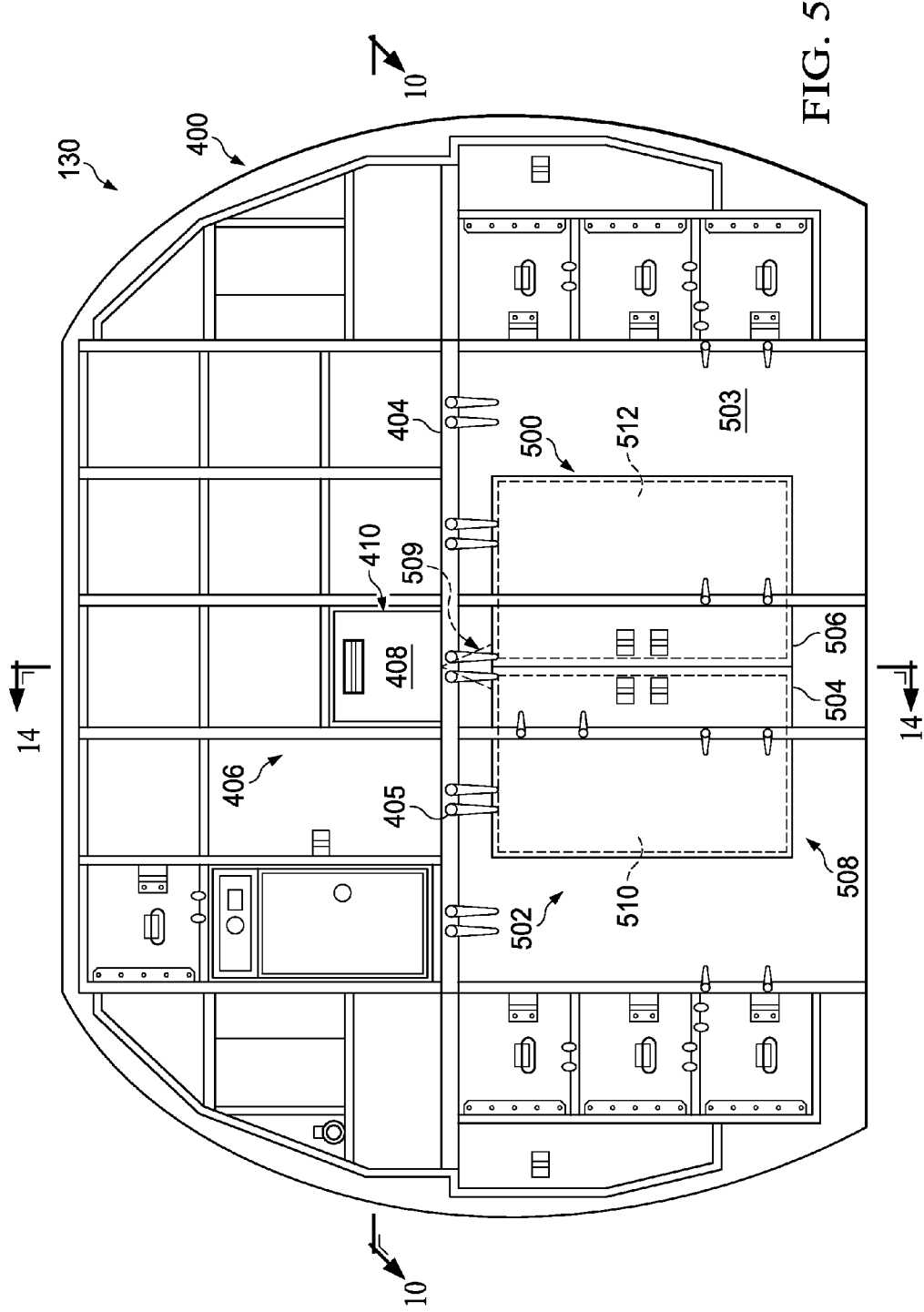
FIG. 5 is an illustration of a galley of an aircraft with a waste disposal system in accordance with an illustrative embodiment.

In FIG. 5, an illustration of a galley of an aircraft with a waste disposal system is depicted in accordance with an illustrative embodiment. In this depicted example, carts 402 have been removed from under counter 404 such that group of doors 500 and receptacle system 502 are shown. Receptacle system 502 and the components within receptacle system 502 are shown in hidden detail (dashed lines) in this illustrative example.

In this depicted example, group of doors 500 are located under counter 404 in wall 503 of galley 130. Group of doors 500 are configured to open and close to access receptacle system 502. In this illustrative example, group of doors 500 includes first door 504 and second door 506 that open to access receptacle system 502.

As depicted, receptacle system 502 is located in a space between galley 130 and an aft pressure bulkhead (not shown) of aircraft 100. In this illustrative example, receptacle system 502 includes group of bins 508 and deflector 509. Group of bins 508 receives waste from drawer system 408 in this illustrative example.

Group of bins 508 comprises first bin 510 and second bin 512. First bin 510 and second bin 512 are positioned next to one another in the space behind wall 503 of galley 130. In this illustrative example, first door 504 opens to expose first bin 510. In a similar fashion, second door 506 opens to expose second bin 512.

In this depicted example, deflector 509 is located above first bin 510 and second bin 512. Deflector 509 directs waste received by receptacle system 502 from drawer system 408 into first bin 510 and second bin 512.

Figure 6:
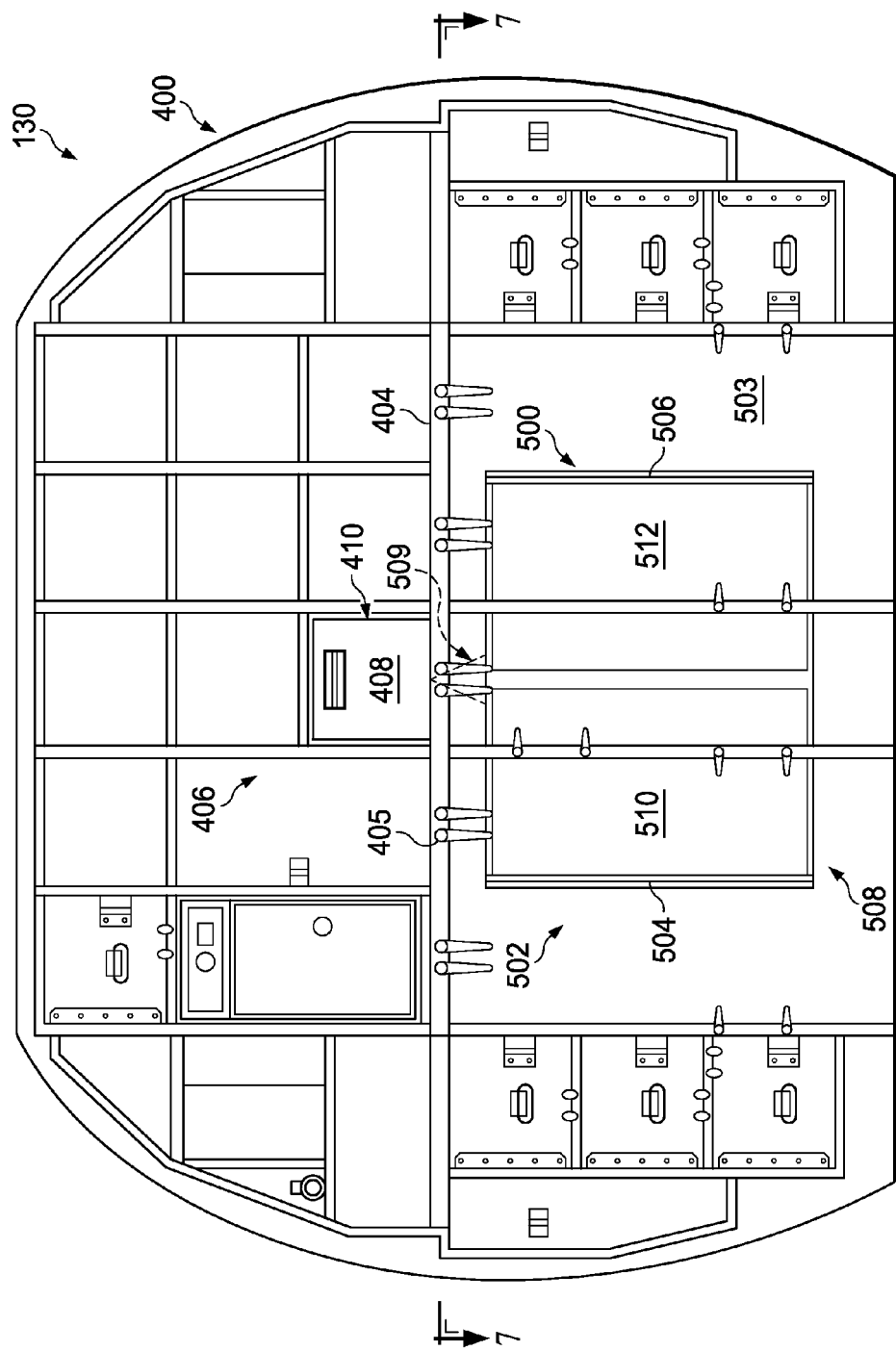
FIG. 6 is another illustration of a galley of an aircraft with a waste disposal system in accordance with an illustrative embodiment.

With reference next to FIG. 6, another illustration of a galley of an aircraft with a waste disposal system is depicted in accordance with an illustrative embodiment. In this depicted example, galley 130 from FIG. 5 is shown with group of doors 500 in an open position. First bin 510 and second bin 512 may be seen behind first door 504 and second door 506, respectively.

Figure 7:
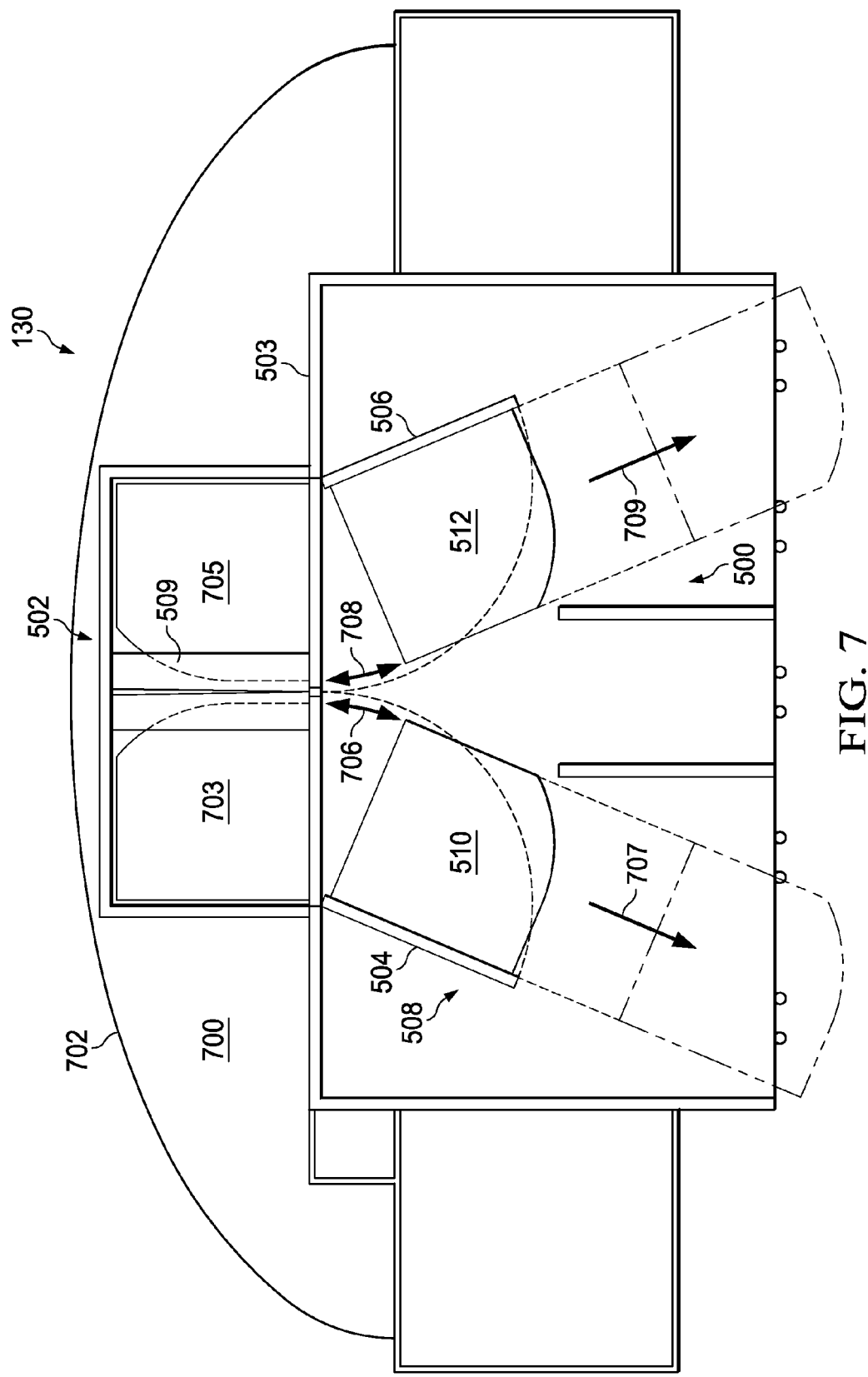
FIG. 7 is an illustration of a cross-sectional view of a galley of an aircraft with a waste disposal system in accordance with an illustrative embodiment.

Turning next to FIG. 7, an illustration of a cross-sectional view of a galley of an aircraft with a waste disposal system is depicted in accordance with an illustrative embodiment. In this depicted example, a cross-sectional view of galley 130 with waste disposal system 406 taken along lines 7-7 in FIG. 6 is shown.

Receptacle system 502 is located within space 700 between wall 503 of galley 130 and aft pressure bulkhead 702 in this illustrative example. Deflector 509 is positioned above space 703 and space 705 in receptacle system 502. Space 703 holds first bin 510 when first door 504 is closed, while space 705 holds second bin 512 when second door 506 is closed.

As depicted, first bin 510 is connected to first door 504 such that first bin 510 moves as first door 504 opens and closes in the direction of arrow 706. In a similar fashion, second bin 512 is connected to second door 506 such that second bin 512 moves as second door 506 opens and closes in the direction of arrow 708.

In this illustrative example, first bin 510 is then moved out from under counter 404 (not shown in this view) in the direction of arrow 707. Second bin 512 is moved out from under counter 404 in the direction of arrow 709 in this illustrative example.

Figure 8:
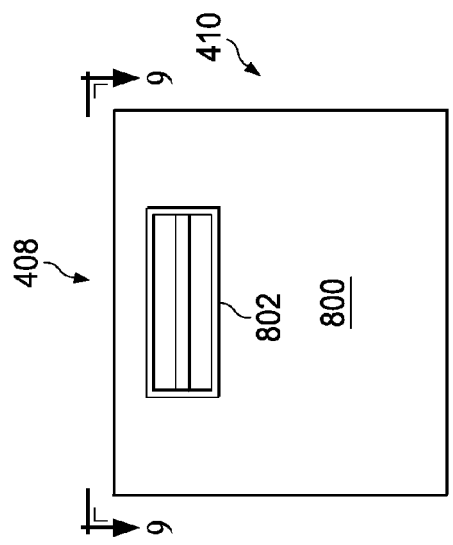
FIG. 8 is an illustration of a front face of a compartment in a drawer system in accordance with an illustrative embodiment.

Referring now to FIG. 8, an illustration of a front face of a compartment in a drawer system is depicted in accordance with an illustrative embodiment. In this depicted example, front face 800 of compartment 410 from FIG. 4 is shown in greater detail.

As depicted, front face 800 of compartment 410 includes handle 802. Handle 802 is used to move compartment 410 above counter 404 in FIG. 4 between an open position and a closed position.

Figure 9:
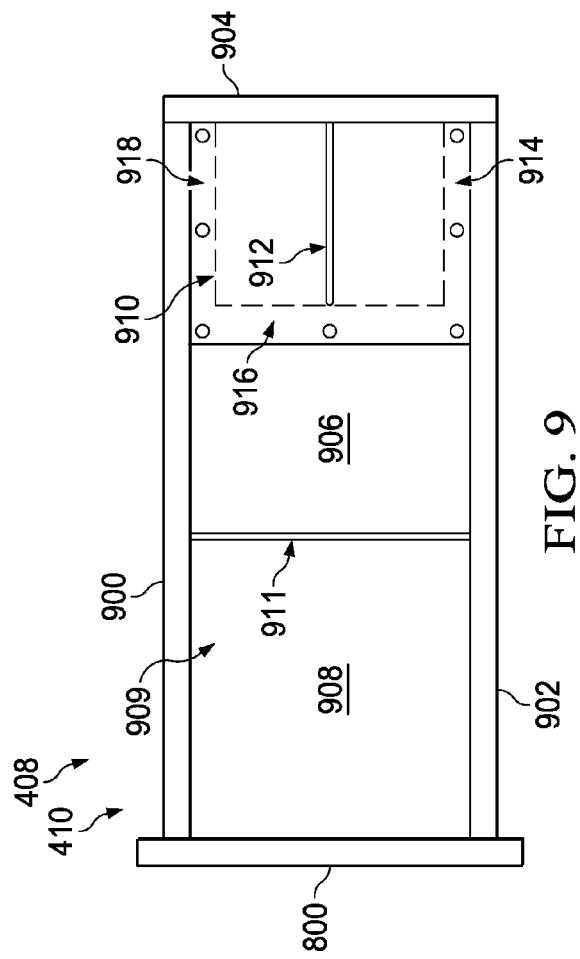
FIG. 9 is an illustration of a top view of a compartment in a drawer system in accordance with an illustrative embodiment.

In FIG. 9, an illustration of a top view of a compartment in a drawer system is depicted in accordance with an illustrative embodiment. In this depicted example, a top view of compartment 410 is shown in the direction of lines 9-9 in FIG. 8.

As depicted, compartment 410 includes side panel 900, side panel 902, and rear panel 904 in addition to front face 800. Moveable barrier 906 and angled portion 908 are located in bottom 909 of compartment 410 in this illustrative example.

As depicted, angled portion 908 and moveable barrier 906 are connected using hinge 911 such that moveable barrier 906 moves relative to angled portion 908. Angled portion 908 is fixed in this illustrative example.

As illustrated, flexible tab 910 is connected to moveable barrier 906. Flexible tab 910 is configured to move downward on a deflector. The flexible material used for flexible tab 910 is selected such that flexible tab 910 may deform when compartment 410 is in a closed position and return to its original shape as compartment 410 is moved to an open position.

In this illustrative example, flexible tab 910 has slit 912. Slit 912 is configured to open to allow a deflector to move through slit 912. In this depicted example, flexible tab 910 is connected to moveable barrier 906 along side 914, side 916, and side 918 of flexible tab 910. Flexible tab 910 with slit 912 aids in moving compartment 410 between an open position and a closed position.

In other illustrative examples, more than one flexible tab may be present. For instance, when two flexible tabs are present, each of those tabs are connected to moveable barrier 906 along three sides. The two flexible tabs meet at an interface, where the deflector may move between the two flexible tabs.

Figure 10:
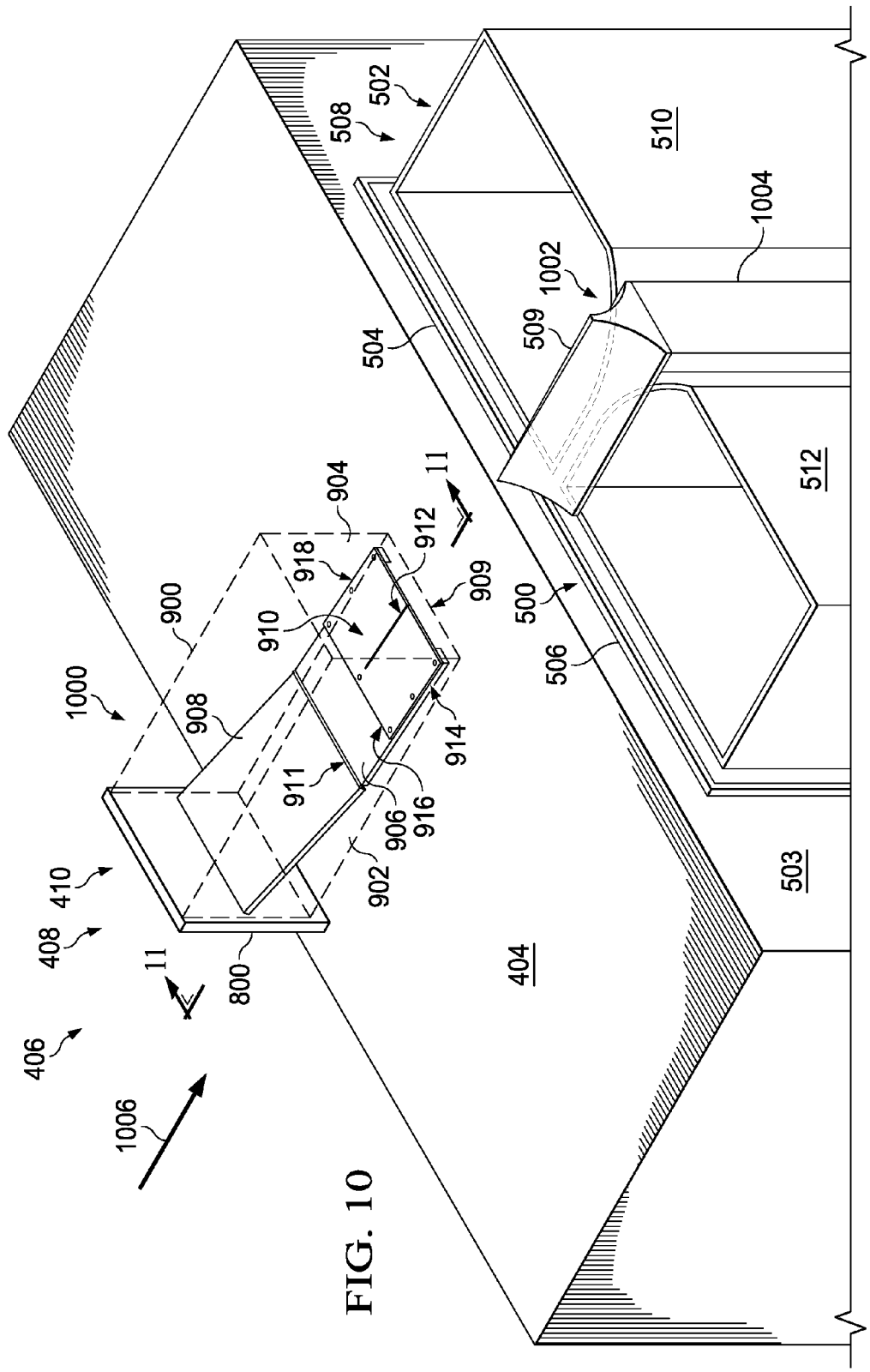
FIG. 10 is an illustration of a perspective view of a waste disposal system for a galley in accordance with an illustrative embodiment.

Referring next to FIG. 10, an illustration of a perspective view of a waste disposal system for a galley is depicted in accordance with an illustrative embodiment. In this depicted example, waste disposal system 406 for galley 130 is shown in the direction of lines 10-10 in FIG. 5. Other structures within galley 130 have been removed from FIG. 10 to show the features of waste disposal system 406 in greater detail.

As depicted, compartment 410 is shown in open position 1000. In open position 1000, moveable barrier 906 forms a portion of bottom 909 of compartment 410. Waste is received by compartment 410 when compartment 410 is in open position 1000.

In this illustrative example, deflector 509 has triangular shape 1002. Triangular shape 1002 of deflector 509 is configured to direct waste into receptacle system 502. In this illustrative example, triangular shape 1002 of deflector 509 separates waste into first bin 510 and second bin 512. Deflector 509 is positioned above structure 1004 between first bin 510 and second bin 512 in this illustrative example.

As depicted, compartment 410 moves above counter 404 in the direction of arrow 1006 to a closed position. Compartment 410 moves to a closed position such that the waste received in compartment 410 is moved from compartment 410 to first bin 510 and second bin 512 using moveable barrier 906.

Figure 11:
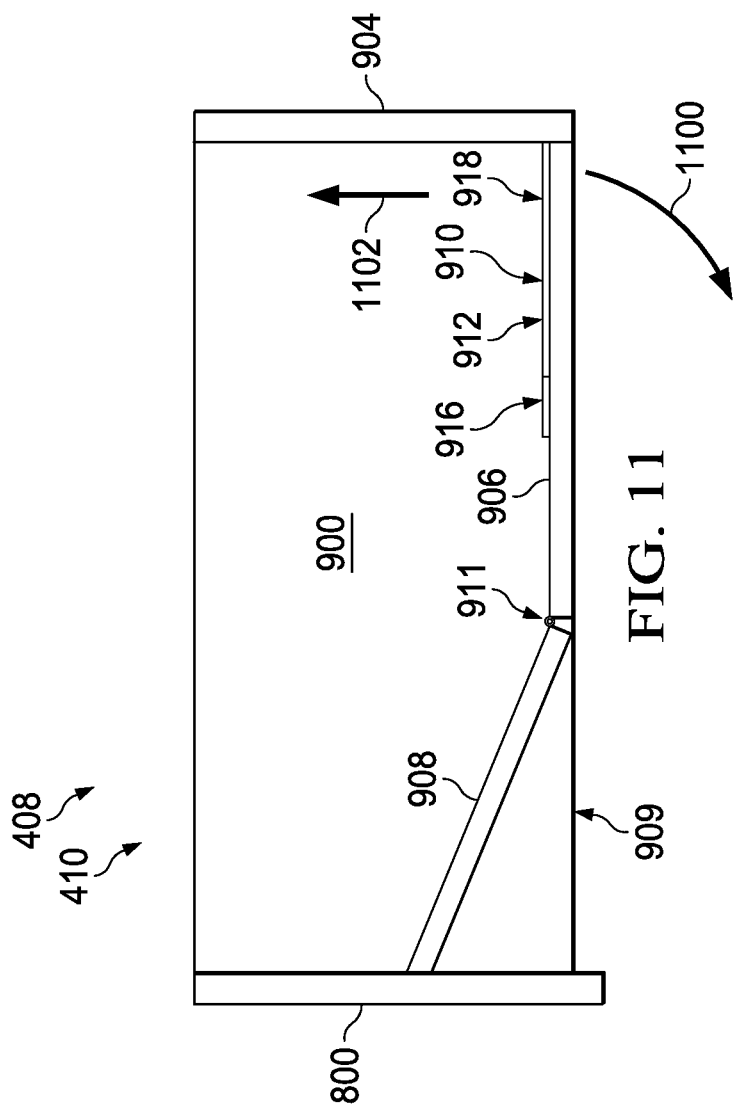
FIG. 11 is an illustration of a cross-sectional view of a compartment in a drawer system in accordance with an illustrative embodiment.

With reference now to FIG. 11, an illustration of a cross-sectional view of a compartment in a drawer system is depicted in accordance with an illustrative embodiment. In this depicted example, a cross-sectional view of compartment 410 taken along lines 11-11 in FIG. 10 is shown. When compartment 410 is moved to a closed position from open position 1000 in FIG. 10, moveable barrier 906 with flexible tab 910 moves in the direction of arrow 1100 to expose an opening (not shown). Slit 912 in flexible tab 910 opens in the direction of arrow 1102 to initiate movement of moveable barrier 906 in this illustrative example.

Figure 12:
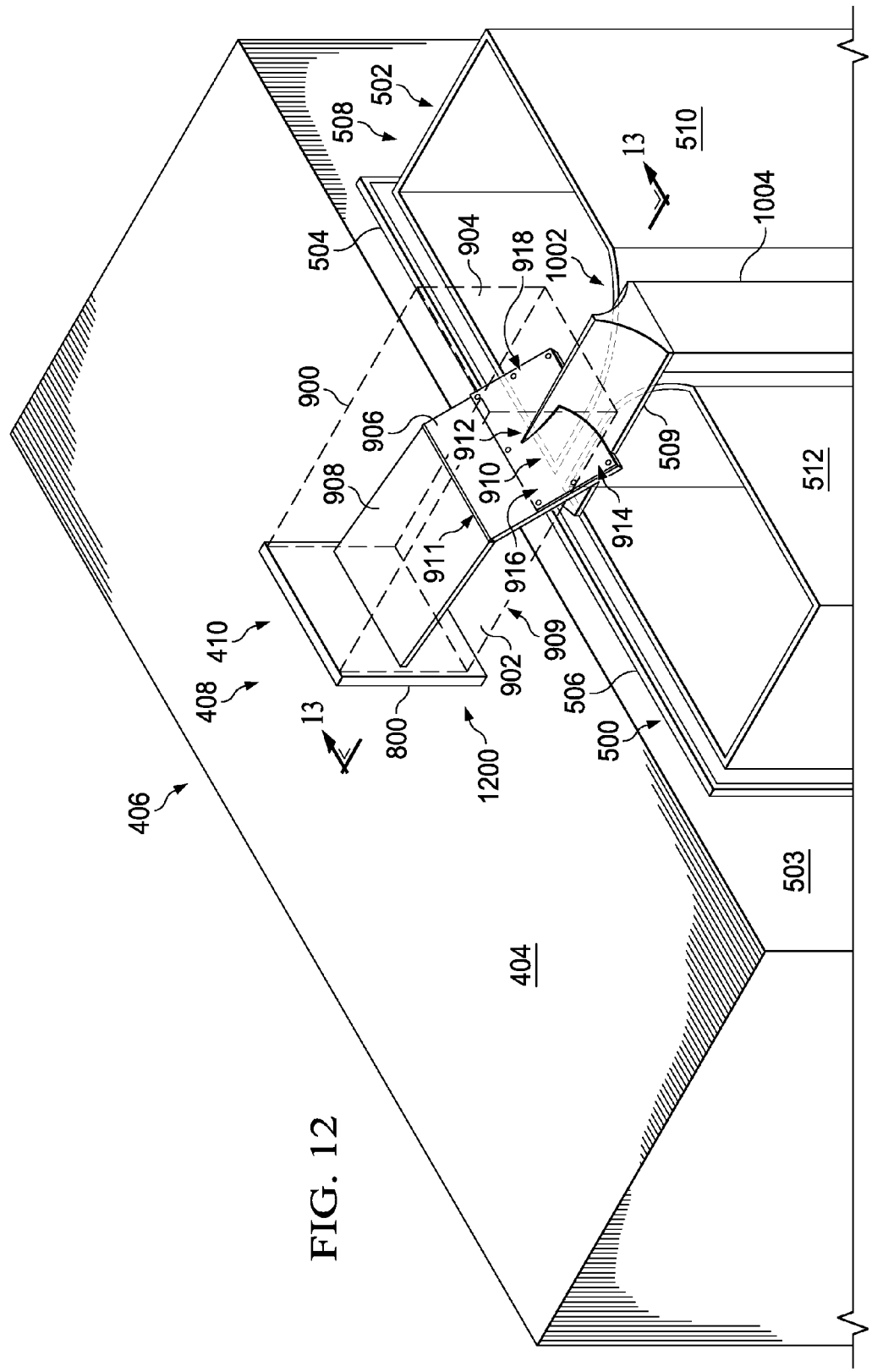
FIG. 12 is an illustration of a perspective view of a waste disposal system for a galley in accordance with an illustrative embodiment.

Turning now to FIG. 12, an illustration of a perspective view of a waste disposal system for a galley is depicted in accordance with an illustrative embodiment. In this depicted example, compartment 410 in drawer system 408 of waste disposal system 406 has been moved in the direction of arrow 1006 in FIG. 10 to closed position 1200.

In closed position 1200, flexible tab 910 is positioned above deflector 509. The tip of deflector 509 causes flexible tab 910 to separate at slit 912. As deflector 509 separates flexible tab 910 at slit 912, flexible tab 910 slides down the sides of deflector 509 to open in the direction of arrow 1102 in FIG. 11. When slit 912 of flexible tab 910 opens, moveable barrier 906 moves in the direction of arrow 1100 in FIG. 11 such that waste received by compartment 410 is moved into at least one of first bin 510 and second bin 512.

Figure 13:
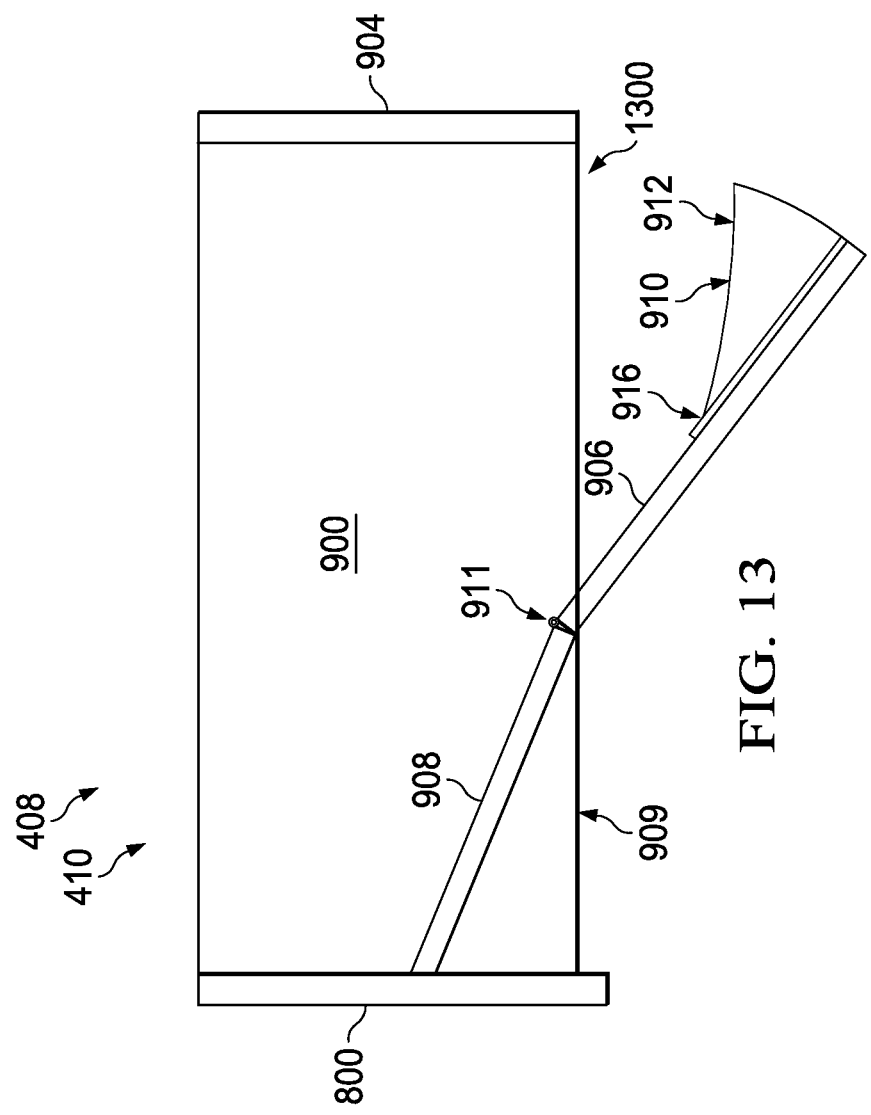
FIG. 13 is an illustration of a cross-sectional view of a compartment in a drawer system in accordance with an illustrative embodiment.

In FIG. 13, an illustration of a cross-sectional view of a compartment in a drawer system is depicted in accordance with an illustrative embodiment. In this depicted example, a cross-sectional view of compartment 410 taken along lines 13-13 in FIG. 12 is shown.

In this illustrative example, moveable barrier 906 has moved relative to angled portion 908 to expose opening 1300. Moveable barrier 906 moves relative to angled portion 908 using hinge 911. Waste received in compartment 410 is moved into receptacle system 502 in FIG. 12 through opening 1300 in this illustrative example.

FIGS. 14-18 depict a waste disposal system with a drawer system and a receptacle system arranged in a galley. Specifically, FIGS. 14-18 depict waste disposal system 406 as compartment 410 in drawer system 408 is moved from open position 1000 to closed position 1200. FIGS. 14-18 are illustrations of a cross-sectional view of waste disposal system 406 in galley 130 taken along lines 14-14 in FIG. 5.

Figure 14:
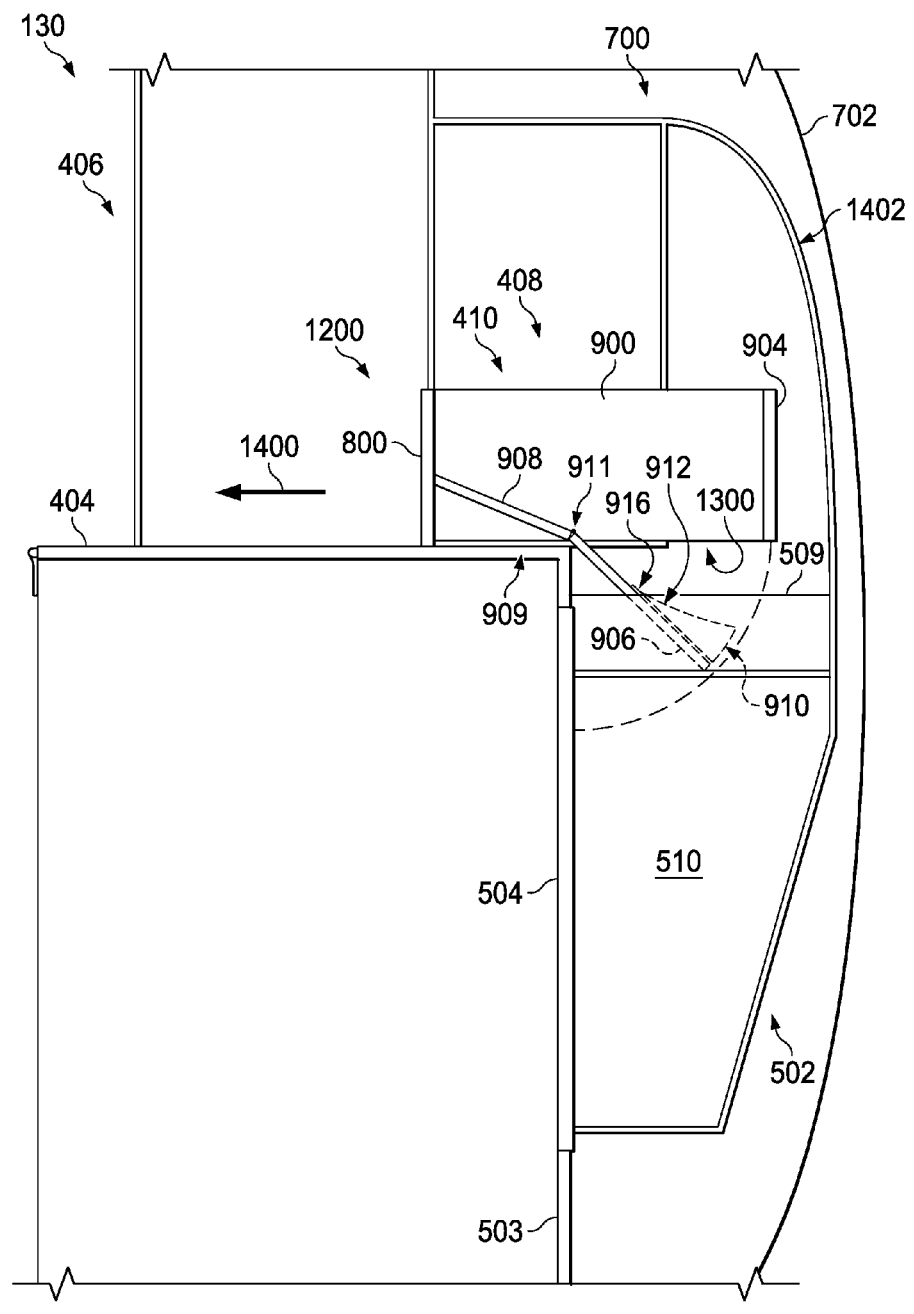
FIG. 14 is an illustration of a cross-sectional view of a waste disposal system in a galley in accordance with an illustrative embodiment.

In FIG. 14, an illustration of a cross-sectional view of a waste disposal system in a galley is depicted in accordance with an illustrative embodiment. In this depicted example, compartment 410 is in closed position 1200. Opening 1300 is exposed in this depicted example. Compartment 410 is moved above counter 404 in the direction of arrow 1400.

As depicted, waste disposal system 406 forms sealed chamber 1402 between galley 130 and aft pressure bulkhead 702. Sealed chamber 1402 is configured to reduce the risk of fires in waste disposal system 406. In other words, waste disposal system 406 is designed to contain fires that may occur if flammable material is received by waste disposal system 406. In this illustrative example, waste disposal system 406 is configured such that a fire within waste disposal system 406 will be contained and the fire will self-extinguish.

Figure 15:
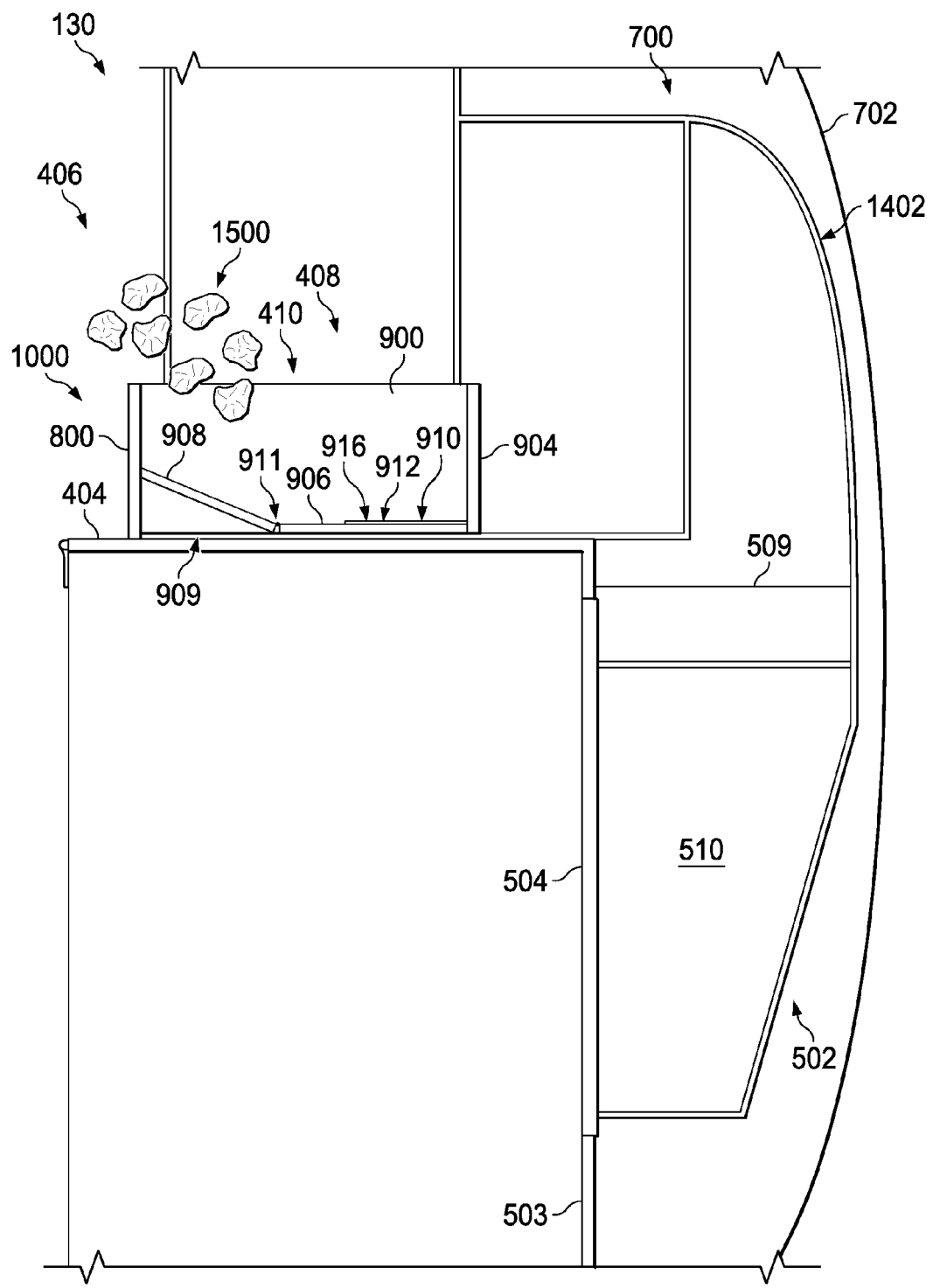
FIG. 15 is another illustration of a cross-sectional view of a waste disposal system in a galley in accordance with an illustrative embodiment.

Turning now to FIG. 15, another illustration of a cross-sectional view of a waste disposal system in a galley is depicted in accordance with an illustrative embodiment. In this illustrative example, compartment 410 has moved to open position 1000. As depicted, waste 1500 is placed in compartment 410.

Figure 16:
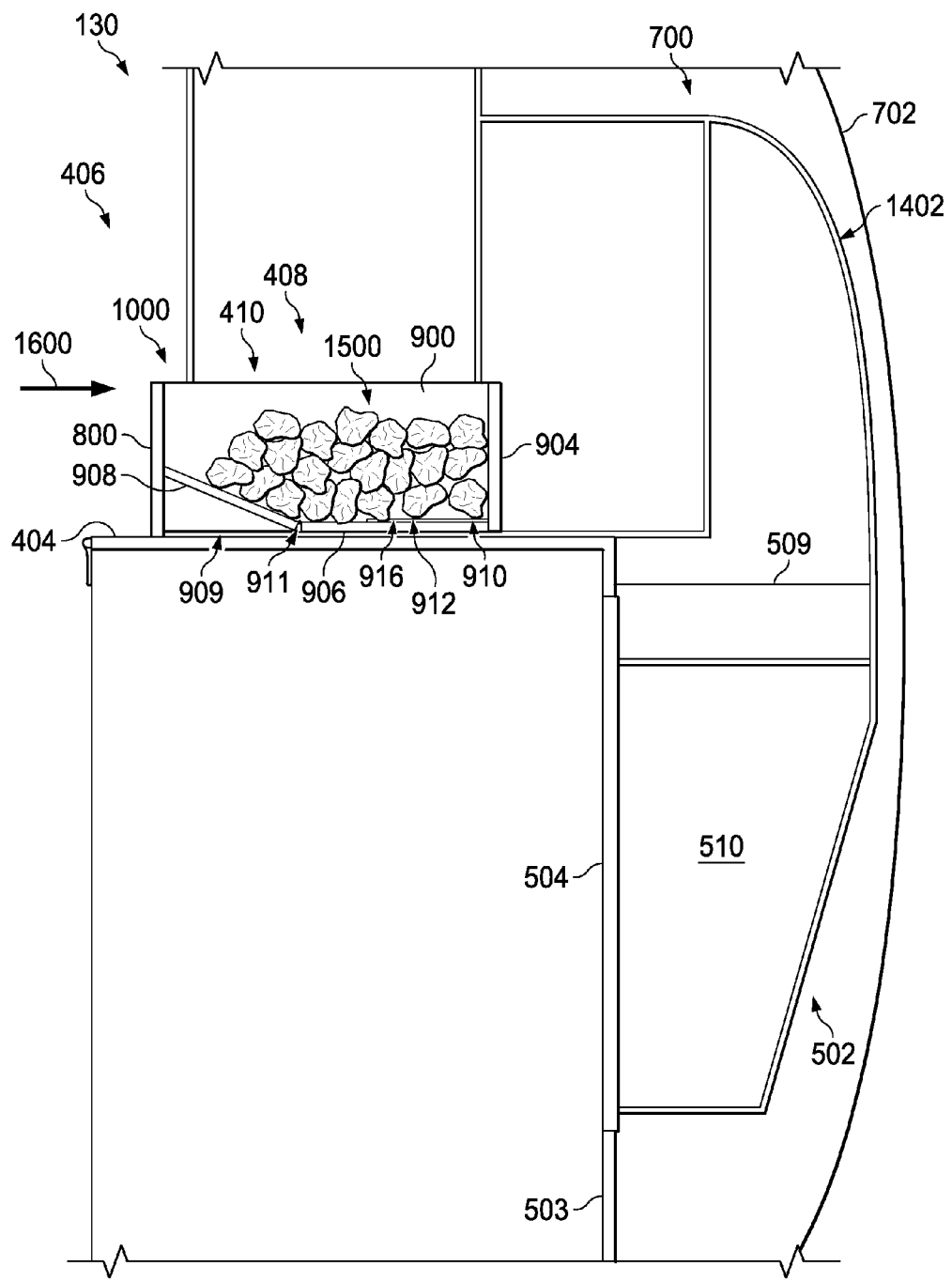
FIG. 16 is another illustration of a cross-sectional view of a waste disposal system in a galley in accordance with an illustrative embodiment.

In FIG. 16, another illustration of a cross-sectional view of a waste disposal system in a galley is depicted in accordance with an illustrative embodiment. In this depicted example, waste 1500 is held in compartment 410 as compartment 410 is moved in the direction of arrow 1600 to closed position 1200.

Figure 17:
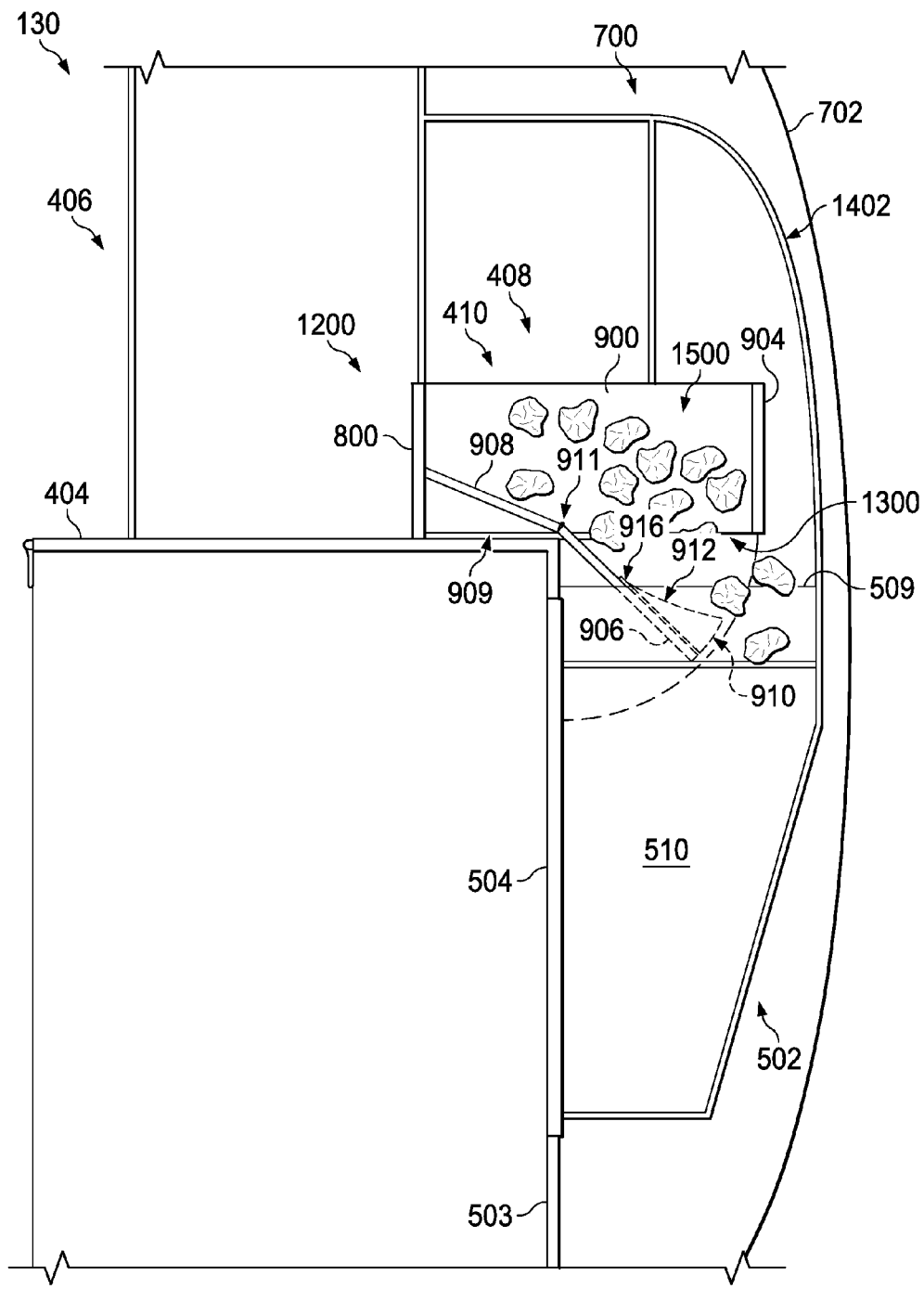
FIG. 17 is yet another illustration of a cross-sectional view of a waste disposal system in a galley in accordance with an illustrative embodiment.

Referring next to FIG. 17, yet another illustration of a cross-sectional view of a waste disposal system in a galley is depicted in accordance with an illustrative embodiment. In this depicted example, compartment 410 has moved to closed position 1200. Moveable barrier 906 has moved to expose opening 1300. Waste 1500 moves through opening 1300 in compartment 410 into receptacle system 502 in this illustrative example.

Figure 18:
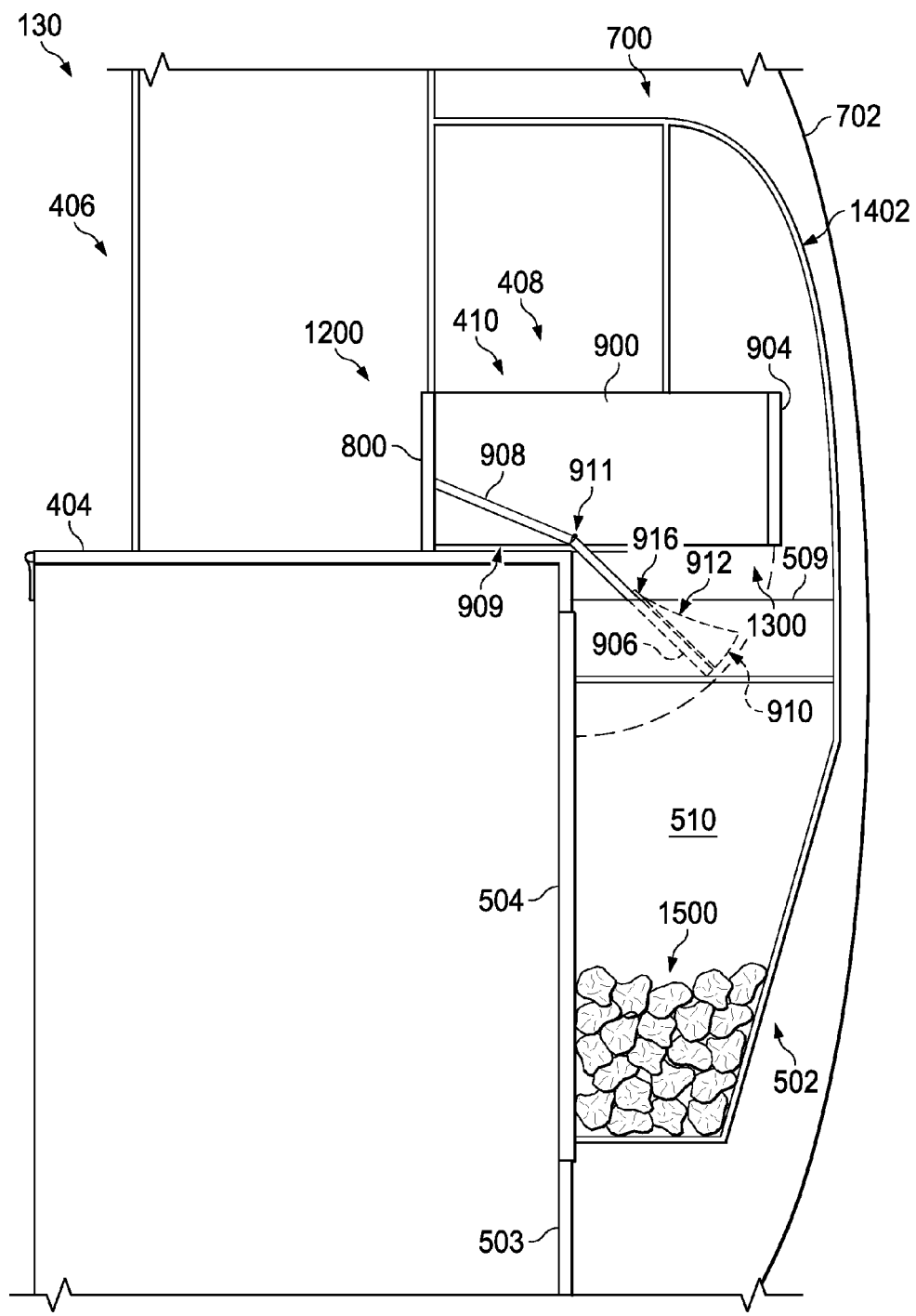
FIG. 18 is yet another illustration of a cross-sectional view of a waste disposal system in a galley in accordance with an illustrative embodiment.

In FIG. 18, yet another illustration of a cross-sectional view of a waste disposal system in a galley is depicted in accordance with an illustrative embodiment. In this depicted example, waste 1500 received by first bin 510 in receptacle system 502 is shown at the bottom of first bin 510. In this manner, waste 1500 may be stored in receptacle system 502 as compartment 410 is moved between open position 1000 and closed position 1200 to receive additional waste.

Figure 19:
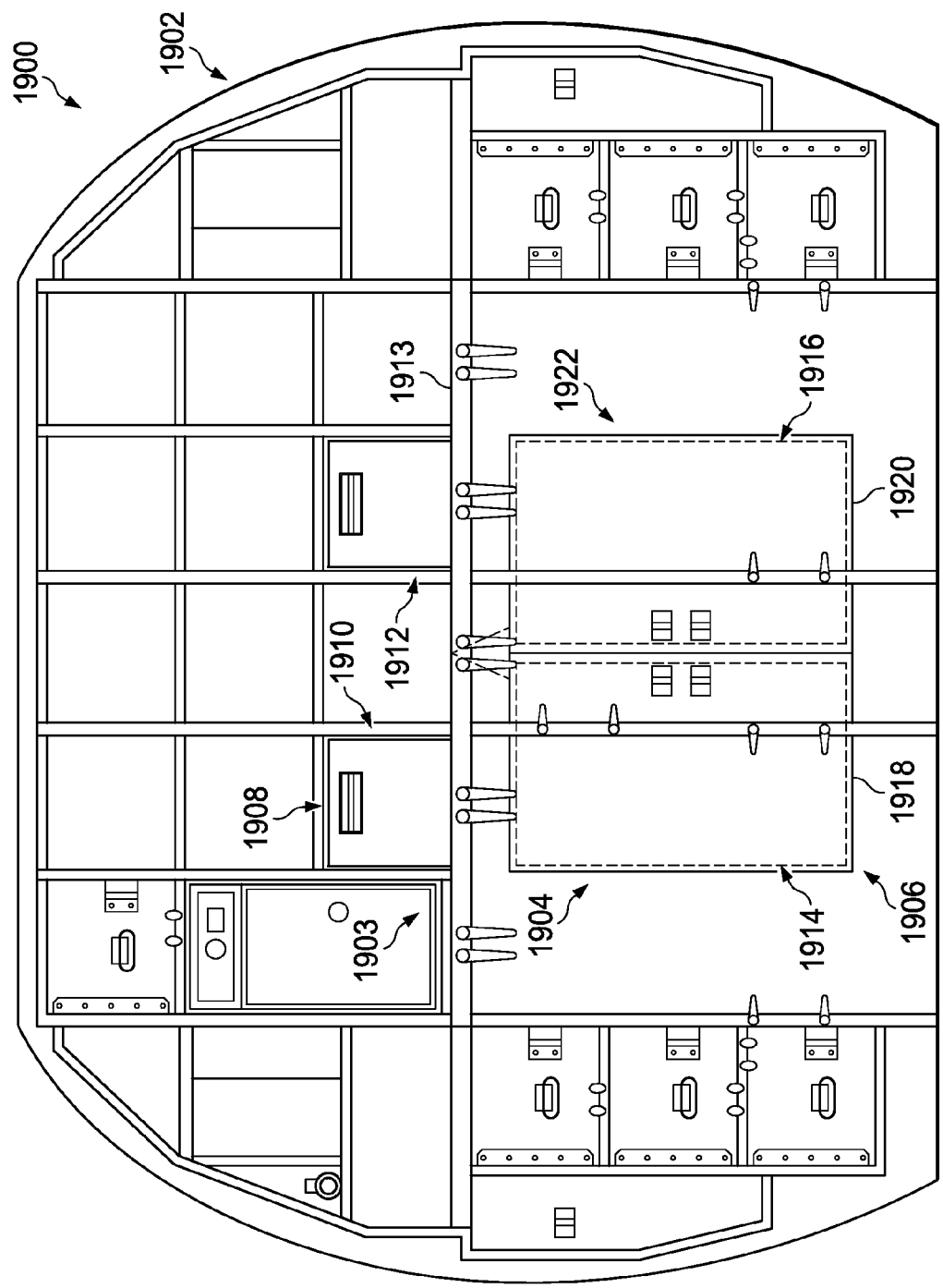
FIG. 19 is an illustration of a galley in an aircraft in accordance with an illustrative embodiment.

With reference next to FIG. 19, an illustration of a galley in an aircraft is depicted in accordance with an illustrative embodiment. In this depicted example, galley 1900 is shown with storage compartments 1902 and waste disposal system 1903. Galley 1900 is an example of another galley that may be used in aircraft 200 shown in block form in FIG. 2. Waste disposal system 1903 includes receptacle system 1904 with group of bins 1906 and drawer system 1908.

In this illustrative example, drawer system 1908 has first compartment 1910 and second compartment 1912. First compartment 1910 and second compartment 1912 move independently of each other in this illustrative example. In other words, one compartment, such as first compartment 1910, may be opened while the other compartment, such as second compartment 1912, remains closed. Both first compartment 1910 and second compartment 1912 slide back and forth above counter 1913 in this illustrative example.

As illustrated, first compartment 1910 is in communication with first bin 1914 in group of bins 1906. Second compartment 1912 is in communication with second bin 1916 in group of bins 1906. First bin 1914 and second bin 1916 are shown in hidden detail (dashed lines) in this illustrative example. First bin 1914 and second bin 1916 are separated from one another by a structure within receptacle system 1904. In this depicted example, first bin 1914 and second bin 1916 are accessed using first door 1918 and second door 1920, respectively, in group of doors 1922 located under counter 1913.

Figure 20:
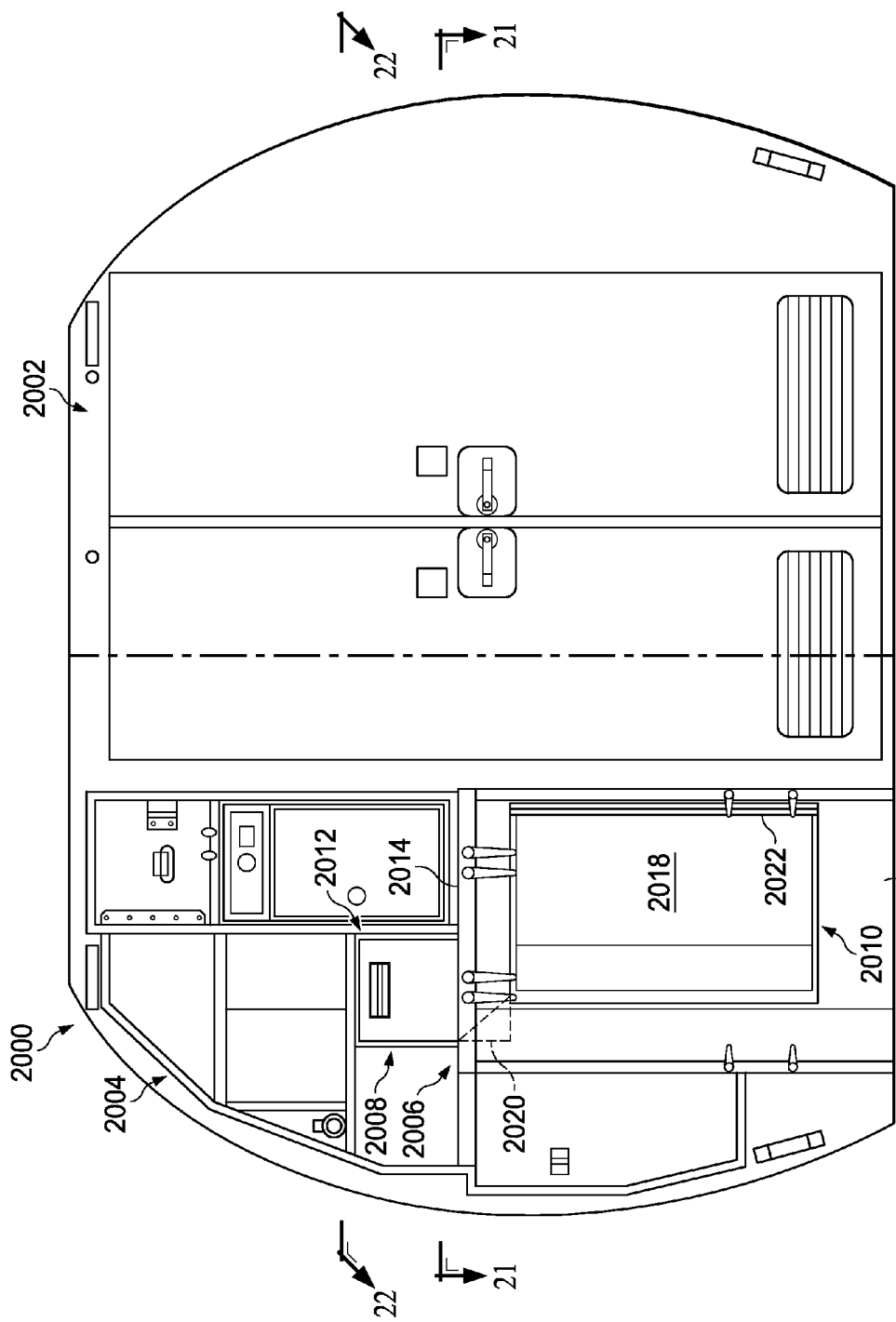
FIG. 20 is an illustration of a galley and lavatories in an aft section of an aircraft in accordance with an illustrative embodiment.

Turning now to FIG. 20, an illustration of a galley and lavatories in an aft section of an aircraft is depicted in accordance with an illustrative embodiment. In this depicted example, galley 2000 is located next to lavatories 2002. Galley 2000 is an example of another physical implementation for galley 204 as shown in block form in FIG. 2.

As depicted, galley 2000 includes storage compartments 2004. Waste disposal system 2006 with drawer system 2008 and receptacle system 2010 is associated with galley 2000. In this illustrative example, drawer system 2008 includes compartment 2012 above counter 2014 of galley 2000. Receptacle system 2010 includes bin 2018 and deflector 2020. Deflector 2020 is shown in hidden detail (dashed lines) in this illustrative example. Bin 2018 is accessed using door 2022 in wall 2024 of galley 2000.

Figure 21:
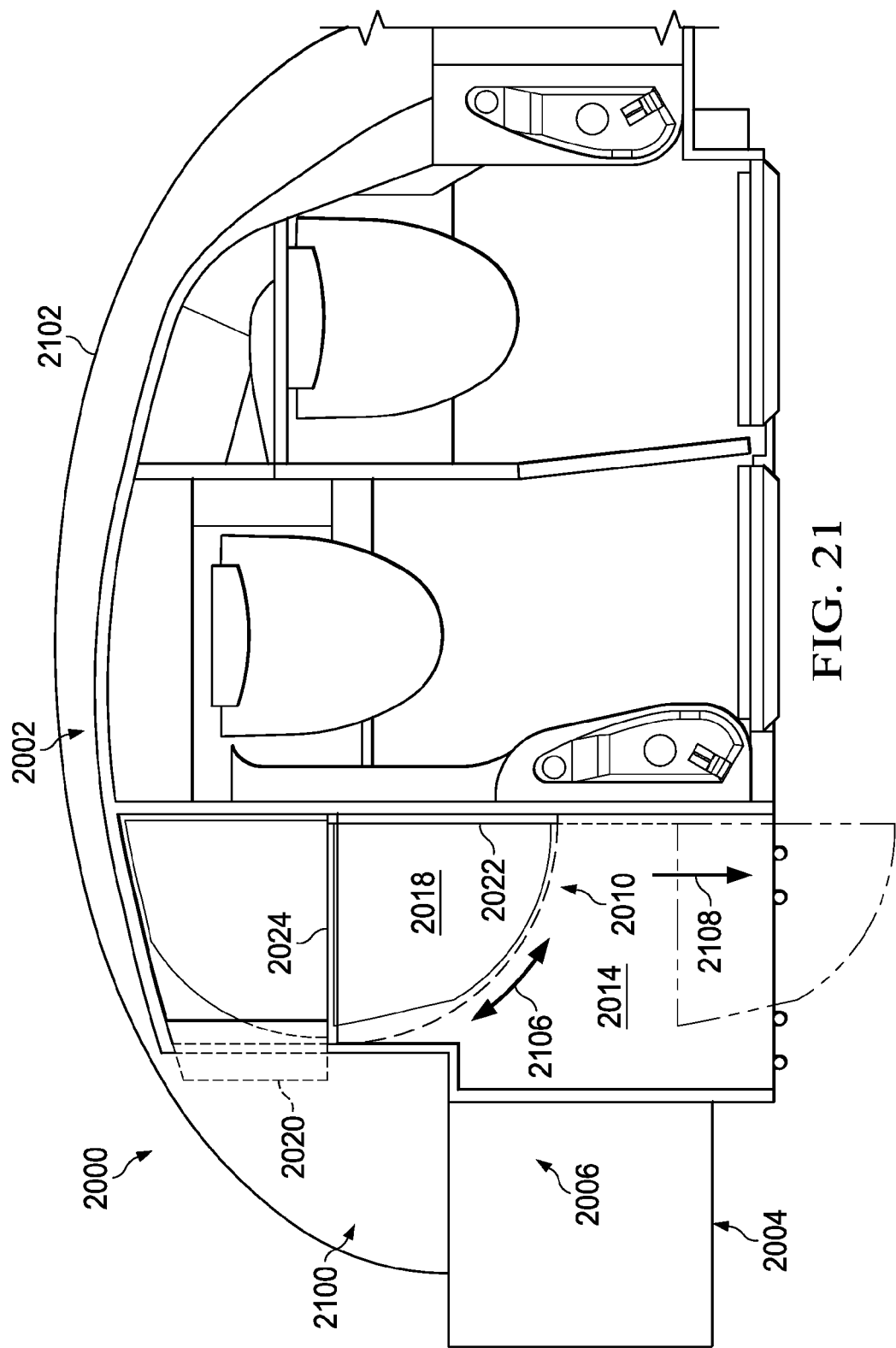
FIG. 21 is an illustration of a cross-sectional view of a galley and lavatories in accordance with an illustrative embodiment.

With reference next to FIG. 21, an illustration of a cross-sectional view of a galley and lavatories is depicted in accordance with an illustrative embodiment. In this illustrative example, a cross-sectional view of galley 2000 and lavatories 2002 taken along lines 21-21 in FIG. 20 is shown.

As depicted, receptacle system 2010 is located within space 2100 between wall 2024 of galley 2000 and aft pressure bulkhead 2102 in this illustrative example. Deflector 2020 is positioned above space 2100 in receptacle system 2010. Space 2100 holds bin 2018 when door 2022 is closed.

As depicted, bin 2018 is connected to door 2022 such that bin 2018 moves as door 2022 opens and closes in the direction of arrow 2106. Bin 2018 then may be removed from under counter 2014 (not shown in this view) in the direction of arrow 2108.

Figure 22:
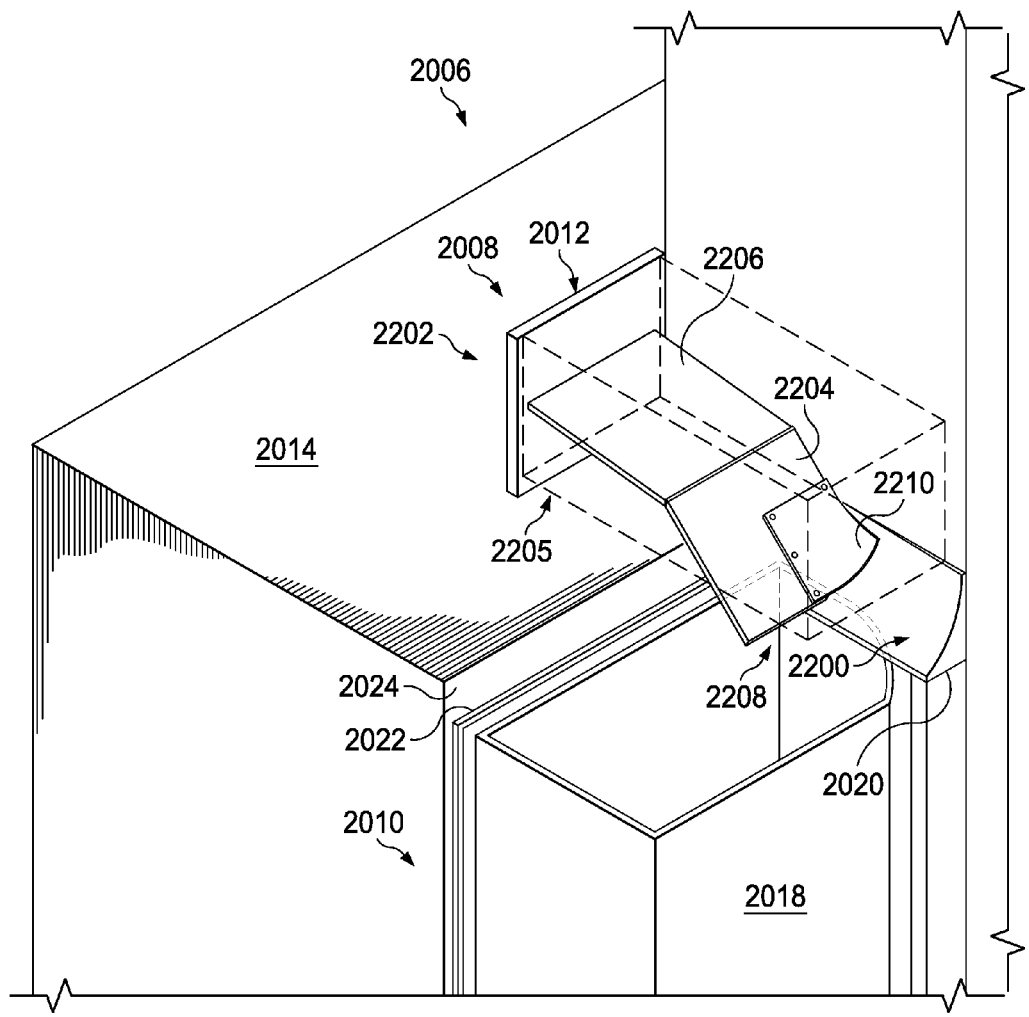
FIG. 22 is an illustration of a perspective view of a waste disposal system for a galley in accordance with an illustrative embodiment.

Referring now to FIG. 22, an illustration of a perspective view of a waste disposal system for a galley is depicted in accordance with an illustrative embodiment. In this depicted example, waste disposal system 2006 for galley 2000 is shown with drawer system 2008 and receptacle system 2010 in the direction of lines 22-22 in FIG. 20. Other structures within galley 2000 have been removed from FIG. 22 to show the features of waste disposal system 2006 in greater detail.

As depicted, deflector 2020 has slanted shape 2200 configured to direct waste into bin 2018 in a desired manner. Compartment 2012 is shown in closed position 2202 in this illustrative example.

In closed position 2202, moveable barrier 2204 in bottom 2205 of compartment 2012 has moved relative to angled portion 2206 using a hinge to expose opening 2208. Flexible tab 2210 associated with moveable barrier 2204 has opened such that moveable barrier 2204 may move in a downward direction. Waste received in compartment 2012 is moved into receptacle system 2010 through opening 2208 in this illustrative example.

Figure 23:
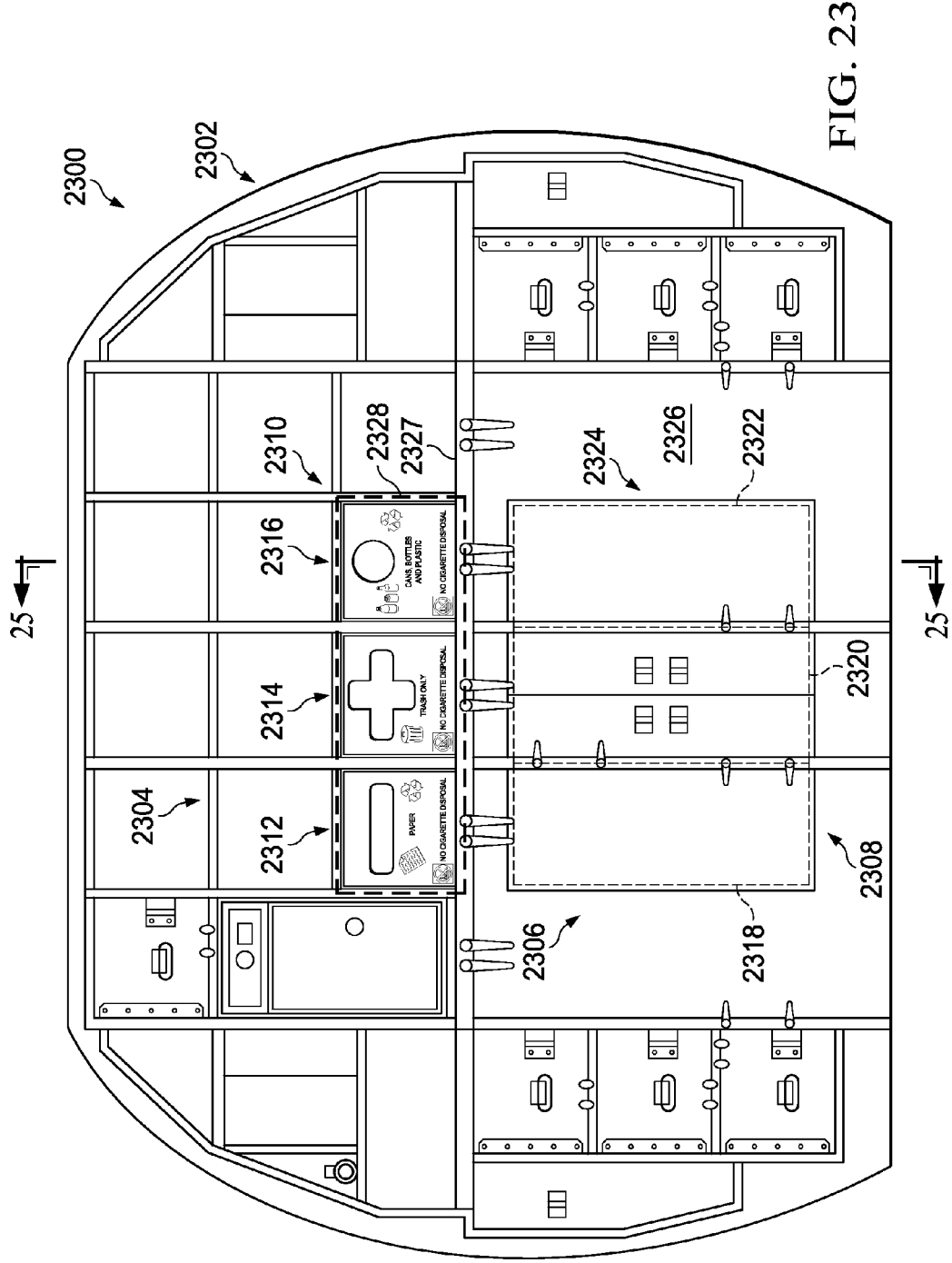
FIG. 23 is an illustration of a galley with a waste disposal system in accordance with an illustrative embodiment.

With reference next to FIG. 23, an illustration of a galley with a waste disposal system is depicted in accordance with an illustrative embodiment. In this depicted example, galley 2300 is shown with storage compartments 2302 and waste disposal system 2304. Galley 2300 is an example of another galley that may be used in aircraft 200 shown in block form in FIG. 2. Waste disposal system 2304 includes receptacle system 2306 with group of bins 2308 and number of waste compartments 2310.

In this illustrative example, number of waste compartments 2310 has first compartment 2312, second compartment 2314, and third compartment 2316. First compartment 2312, second compartment 2314, and third compartment 2316 are stationary compartments. In other words, first compartment 2312, second compartment 2314, and third compartment 2316 do not move from an open position to a closed position in this illustrative example.

First compartment 2312, second compartment 2314, and third compartment 2316 each have an opening through which different types of material may be placed. In this illustrative example, both first compartment 2312 and third compartment 2316 hold recyclable materials, while second compartment 2314 holds trash.

As illustrated, first compartment 2312 is in communication with first bin 2318, second compartment 2314 is in communication with second bin 2320, and third bin 2322 is in communication with third bin 2322. In this depicted example, first bin 2318, second bin 2320, and third bin 2322 are accessed using group of doors 2324 in wall 2326 located under counter 2327 of galley 2300. Number of waste compartments 2310 is shown in section 2328 of galley 2300 in this illustrative example.

Figure 24:
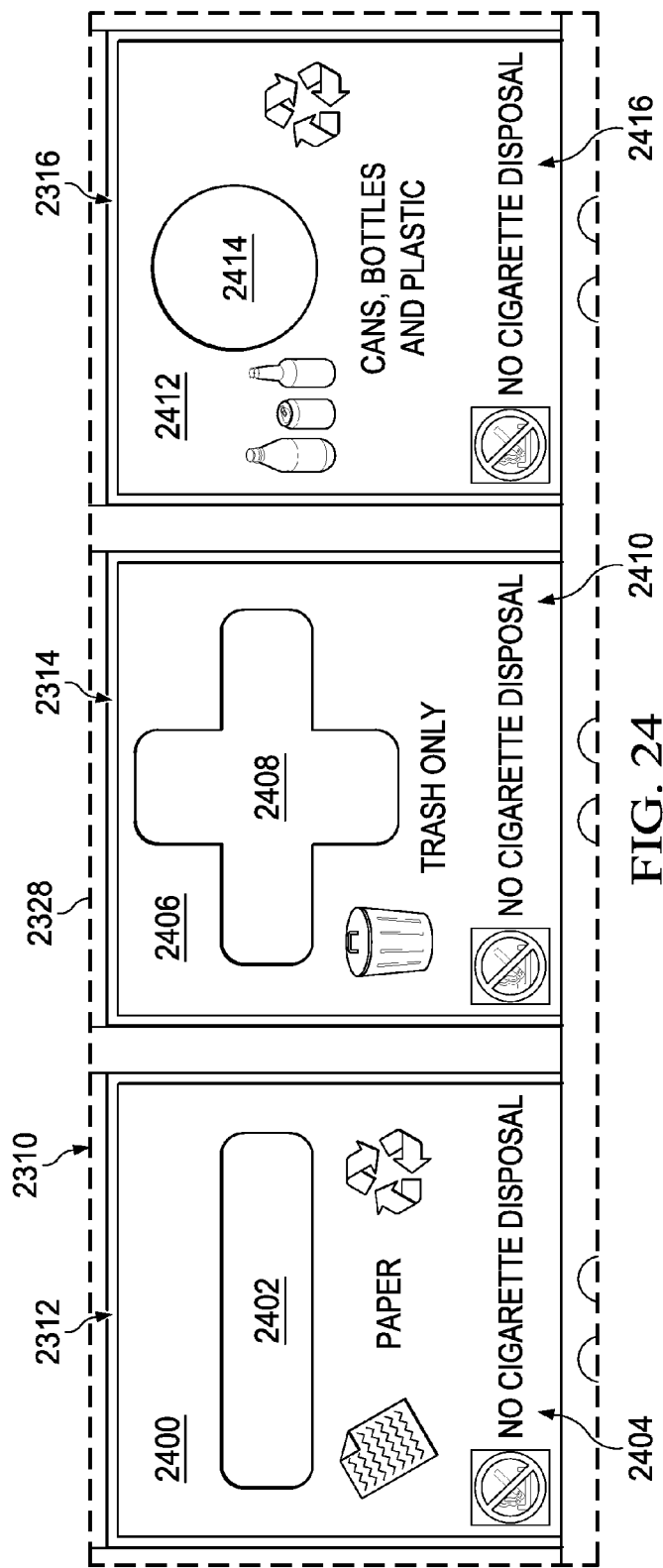
FIG. 24 is an illustration of a front view of a number of waste compartments in accordance with an illustrative embodiment.

Turning now to FIG. 24, an illustration of a front view of a number of waste compartments is depicted in accordance with an illustrative embodiment. In this illustrative example, section 2328 of galley 2300 from FIG. 23 is shown in greater detail.

In this depicted example, first compartment 2312 has front face 2400. Front face 2400 includes opening 2402. First compartment 2312 is configured to receive recyclable materials through opening 2402. In particular, first compartment 2312 is configured to receive paper through opening 2402. In this illustrative example, opening 2402 is shaped such that paper can be easily placed through opening 2402. Opening 2402 is a rectangular opening in this illustrative example.

First compartment 2312 also includes decal 2404 in this illustrative example. Decal 2404 signifies that recyclable paper should be placed in first compartment 2312. Decal 2404 may be color-coded for clear identification. In this illustrative example, decal 2404 is blue. Decal 2404 also includes a warning against cigarette disposal in first compartment 2312.

In this illustrative example, second compartment 2314 has front face 2406. Front face 2406 includes opening 2408. Second compartment 2314 is configured to receive trash through opening 2408. In this depicted example, opening 2408 is shaped such that trash can be easily placed through opening 2408. Opening 2408 has a cross shape in this illustrative example.

Second compartment 2314 also includes decal 2410 in this illustrative example. Decal 2410 signifies that trash should be placed in second compartment 2314. Decal 2410 may be color-coded for clear identification. In this illustrative example, decal 2410 is green. Decal 2410 also includes a warning against cigarette disposal in second compartment 2314.

As illustrated, third compartment 2316 has front face 2412. Front face 2412 includes opening 2414. Third compartment 2316 is configured to receive recyclable materials through opening 2414. In particular, third compartment 2316 is configured to receive cans, bottles, and plastic through opening 2414. In this illustrative example, opening 2414 is shaped such that cans, bottles, and plastic can be easily placed through opening 2414. Opening 2414 has a circular shape in this illustrative example.

Third compartment 2316 also includes decal 2416 in this illustrative example. Decal 2416 signifies that recyclable cans, bottles, and plastic should be placed in third compartment 2316. Similar to decal 2404 and decal 2410, decal 2416 may be color-coded for clear identification. In this illustrative example, decal 2416 is yellow. Decal 2416 also includes a warning against cigarette disposal in third compartment 2316.

Spring loaded flaps (not shown) may cover at least one of opening 2402, opening 2408, or opening 2414 in some illustrative examples. When spring loaded flaps are present in number of waste compartments 2310, these flaps are spring-loaded to close after the waste is pushed through the respective opening for fire containment compliance.

Figure 25:
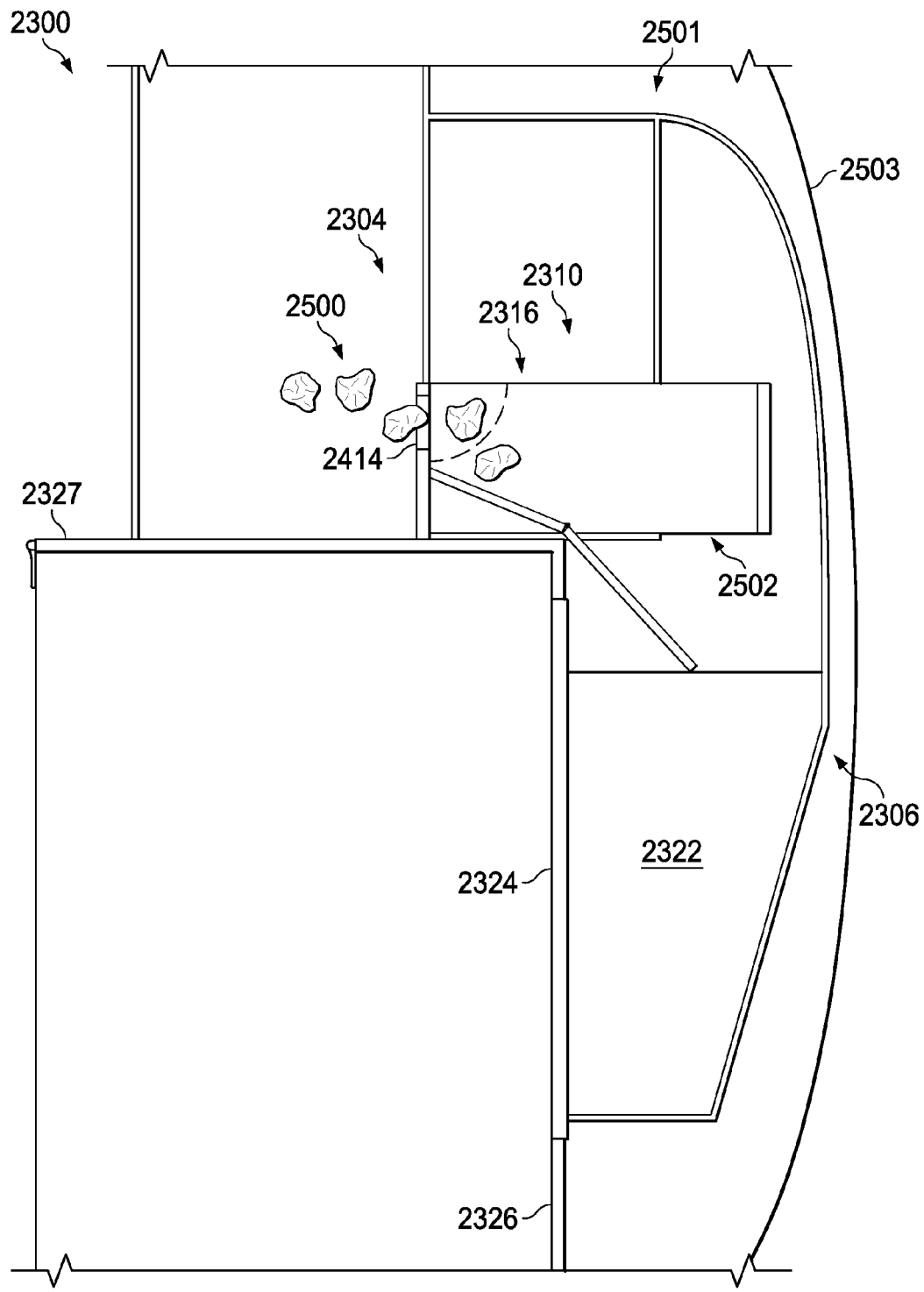
FIG. 25 is an illustration of a cross-sectional view of a waste disposal system in a galley in accordance with an illustrative embodiment.
Figure 26:
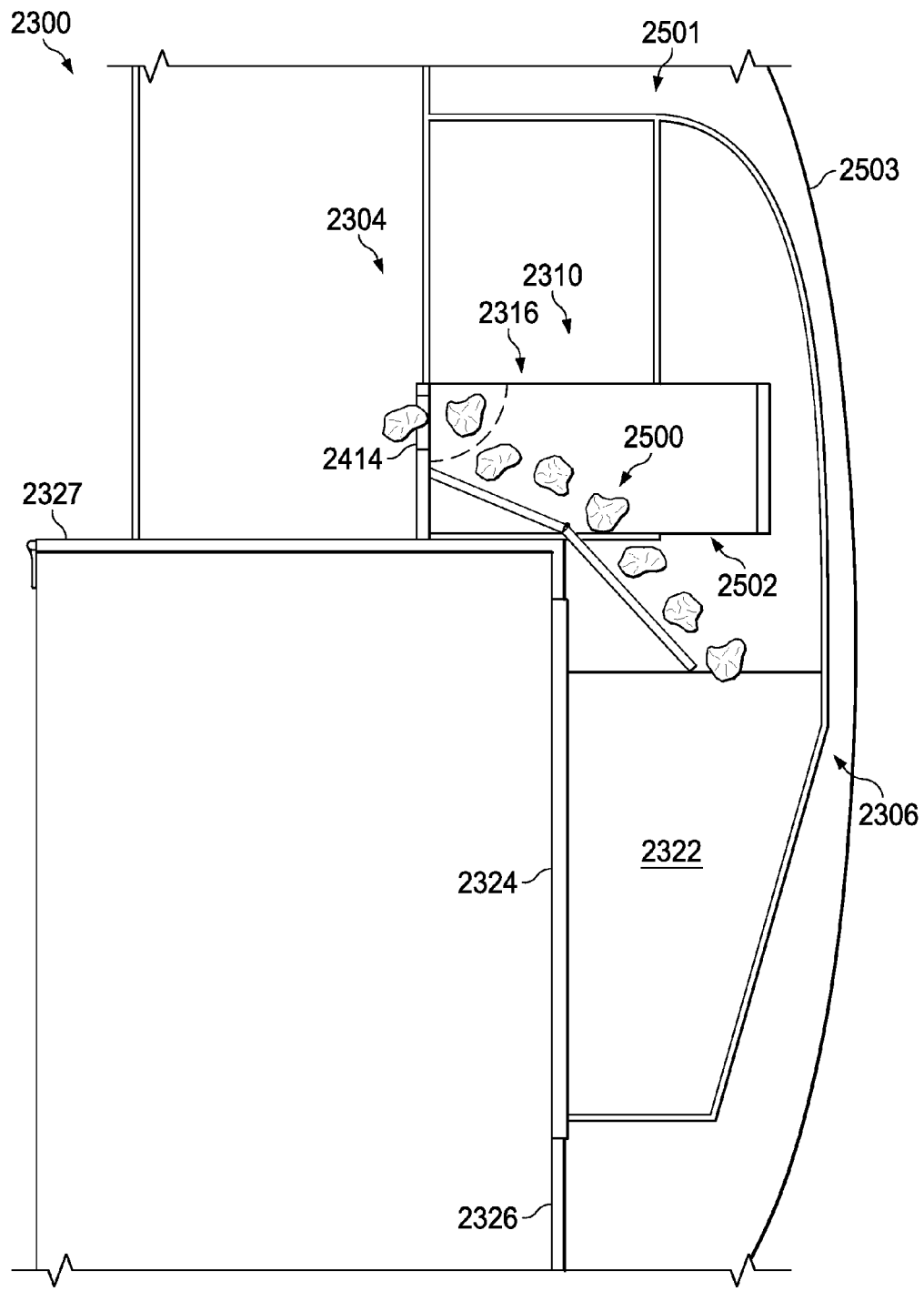
FIG. 26 is another illustration of a cross-sectional view of a waste disposal system in a galley in accordance with an illustrative embodiment.
Figure 27:
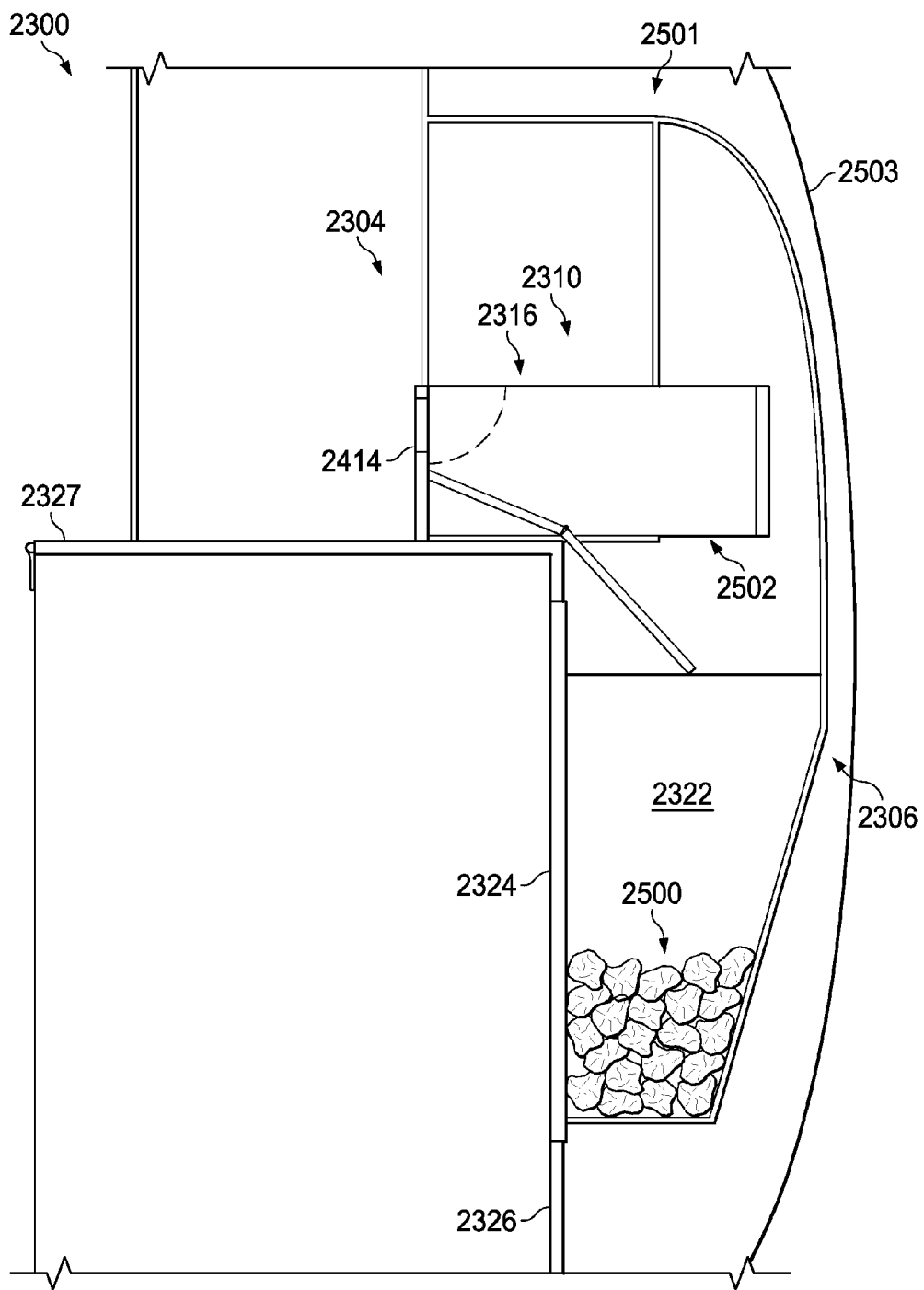
FIG. 27 is yet another illustration of a cross-sectional view of a waste disposal system in a galley in accordance with an illustrative embodiment.

FIGS. 25-27 depict a waste disposal system with a number of compartments and a receptacle system arranged in a galley. Specifically, FIGS. 25-27 depict third compartment 2316 of waste disposal system 2304 used to dispose of recyclable materials. FIGS. 25-27 are illustrations of a cross-sectional view of third compartment 2316 of waste disposal system 2304 in galley 2300 taken along lines 25-25 in FIG. 23.

Referring next to FIG. 25, an illustration of a cross-sectional view of a waste disposal system in a galley is depicted in accordance with an illustrative embodiment. As seen in this figure, receptacle system 2306 is positioned in space 2501 between galley 2300 and aft pressure bulkhead 2503.

In this depicted example, recyclable materials 2500 are placed in third compartment 2316 through opening 2414. Opening 2502 is exposed in this depicted example. In this illustrative example, third compartment 2316 forms a chute for recyclable materials 2500 placed through opening 2414.

In FIG. 26, another illustration of a cross-sectional view of a waste disposal system in a galley is depicted in accordance with an illustrative embodiment. Recyclable materials 2500 move through opening 2502 in third compartment 2316 to third bin 2322 in receptacle system 2306 in this illustrative example.

Turning next to FIG. 27, yet another illustration of a cross-sectional view of a waste disposal system in a galley is depicted in accordance with an illustrative embodiment. In this depicted example, recyclable materials 2500 received by third bin 2322 in receptacle system 2306 are shown at the bottom of third bin 2322. In this manner, recyclable materials 2500 may be stored in third bin 2322 until accessed by the flight crew.

The illustrations of waste disposal system 406 in FIGS. 4-19, waste disposal system 2006 in FIGS. 20-22, waste disposal system 2304 in FIGS. 23-27, and the components within waste disposal system 406, waste disposal system 2006, and waste disposal system 2304 are not meant to imply physical or architectural limitations to the manner in which an illustrative embodiment may be implemented. Other components in addition to or in place of the ones illustrated may be used. Some components may be optional.

In some illustrative examples, front face 800 of compartment 410 shown in FIG. 8 may include a decal. This decal may take the form of at least one of a graphic, text, instructions, a warning, or other suitable types of decals. For example, a decal placed on front face 800 of compartment 410 may be similar to at least one of decal 2404, decal 2410, or decal 2416 shown in FIG. 24.

In yet another illustrative example, deflector 509 may have a different shape than triangular shape 1002 in FIG. 10. For example, deflector 509 may have a dome shape or other suitable shape configured to direct waste into receptacle system 502.

In still other illustrative examples, first compartment 2312, second compartment 2314, and third compartment 2316 from FIG. 23 may take the form of drawers in a drawer system. In this case, instead of stationary compartments, each of first compartment 2312, second compartment 2314, and third compartment 2316 may operate as a drawer system as described above with respect to drawer system 1908 in FIG. 19. For instance, each of first compartment 2312, second compartment 2314, and third compartment 2316 may move back and forth above counter 2327 to dispose of waste and recyclable materials in group of bins 2308.

In another illustrative example, more than three compartments may be present in a waste disposal system. For instance, four compartments, five compartments, ten compartments, or some other number of compartments may be present in a waste disposal system, depending on the needs of the aircraft and the flight crew.

The different components shown in FIGS. 4-27 may be illustrative examples of how components shown in block form in FIG. 2 and FIG. 3 can be implemented as physical structures. Additionally, some of the components in FIGS. 4-27 may be combined with components in FIG. 2 and FIG. 3, used with components in FIG. 2 and FIG. 3, or a combination of the two.

Figure 28:
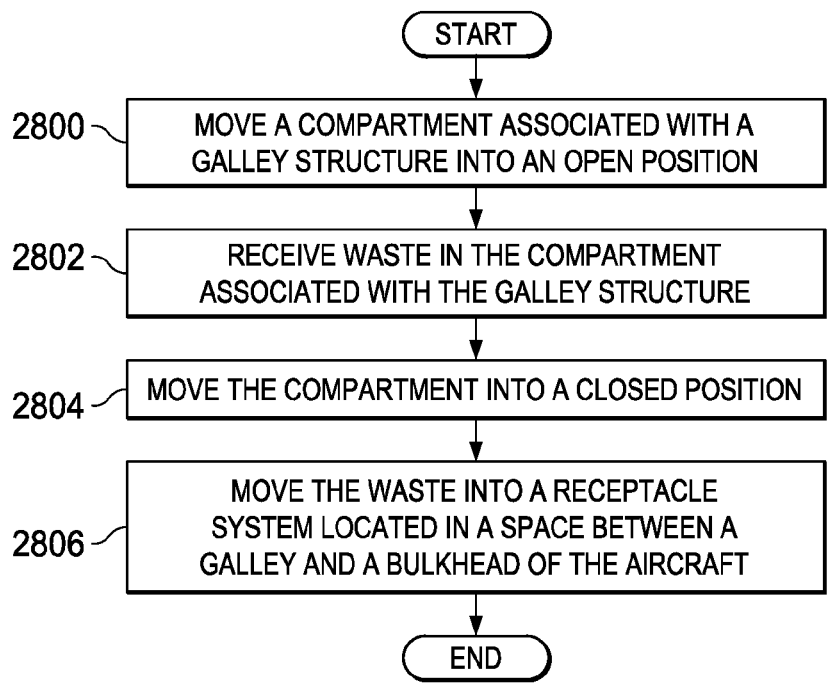
FIG. 28 is an illustration of a flowchart of a process for disposing of waste in an aircraft in accordance with an illustrative embodiment.

With reference now to FIG. 28, an illustration of a flowchart of a process for disposing of waste in an aircraft is depicted in accordance with an illustrative embodiment. The process described in FIG. 28 may be implemented using waste disposal system 220 in fuselage 202 of aircraft 200 in FIG. 2.

The process begins by moving a compartment associated with a galley structure into an open position (operation 2800). For example, flight crew 214 moves compartment 300 into open position 316 by sliding compartment 300 above counter 218. In open position 316, first opening 308 of compartment 300 is exposed. In this illustrative example, the compartment may be part of a drawer system.

Next, waste is received in the compartment associated with the galley structure (operation 2802). In this illustrative example, waste 222 is received through first opening 308 in compartment 300 when compartment 300 is in open position 316.

The compartment is moved into a closed position (operation 2804). In this depicted example, flight crew 214 slides compartment 300 above counter 218 to closed position 318.

The waste is then moved into a receptacle system located in a space between a galley and a bulkhead of the aircraft (operation 2806) with the process terminating thereafter. In this illustrative example, waste 222 is moved from compartment 300 through second opening 310 into receptacle system 224. Waste 222 may be stored in receptacle system 224 during various stages of operation of aircraft 200 until receptacle system 224 is accessed using group of doors 242 located below galley structure 216.

Figure 29:
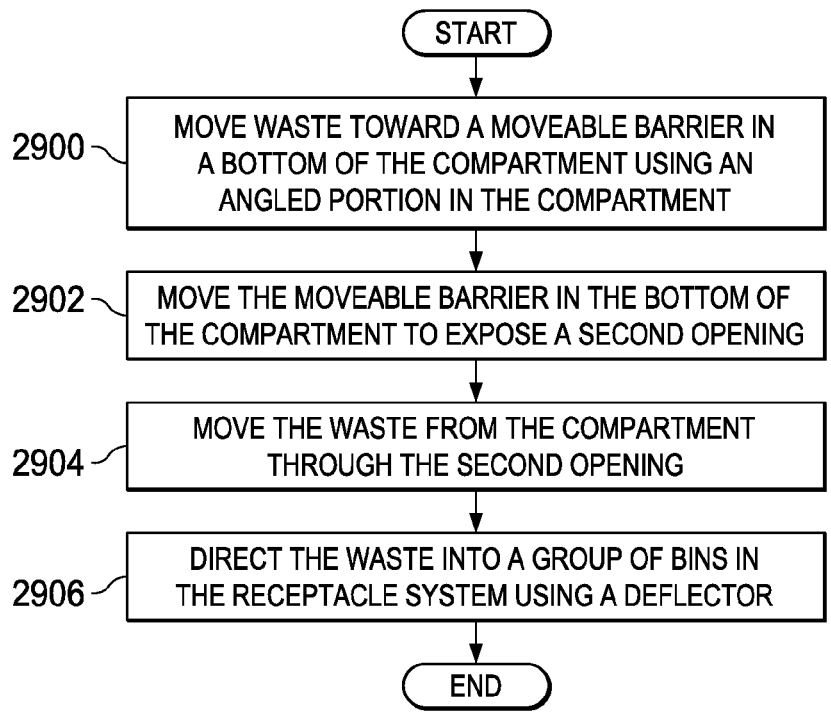
FIG. 29 is an illustration of a flowchart of a process for moving waste from a compartment in a drawer system in accordance with an illustrative embodiment.

Referring next to FIG. 29, an illustration of a flowchart of a process for moving waste from a compartment is depicted in accordance with an illustrative embodiment. The process described in FIG. 29 may take place during operation 2806 from FIG. 28 using compartment 300.

The process begins by moving the waste toward a moveable barrier in a bottom of the compartment using an angled portion in the compartment (operation 2900). Next, the moveable barrier in the bottom of the compartment is moved to expose a second opening (operation 2902). In this illustrative example, group of flexible tabs 328 associated with moveable barrier 302 may initiate movement of moveable barrier 302 to expose second opening 310.

Thereafter, the waste is moved from the compartment through the second opening (operation 2904). The waste is then directed into a group of bins in the receptacle system using a deflector (operation 2906) with the process terminating thereafter.

The illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method is depicted in the form of a block diagram in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 may go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of an aircraft is depicted in the form of a block diagram in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30. In particular, waste disposal system 220 from FIG. 2 may be used during various stages of aircraft manufacturing and service method 3000. For example, without limitation, waste disposal system 220 may be used during in service 3012 by a flight crew. Further, during maintenance and service 3014, waste 222 may be emptied from receptacle system 224.

In another illustrative example, waste disposal system 220 and the components within waste disposal system 220 may be manufactured, installed, reworked, or a combination thereof during at least one of component and subassembly manufacturing 3006, system integration 3008, routine maintenance and service 3014, or some other stage of aircraft manufacturing and service method 3000.

In one illustrative example, components or subassemblies produced in component and subassembly manufacturing 3006 in FIG. 30 may be fabricated or manufactured in a manner similar to components or subassemblies produced while aircraft 3100 is in service 3012 in FIG. 30. As yet another example, one or more apparatus embodiments, method embodiments, or a combination thereof may be utilized during production stages, such as component and subassembly manufacturing 3006 and system integration 3008 in FIG. 30. One or more apparatus embodiments, method embodiments, or a combination thereof may be utilized while aircraft 3100 is in service 3012, during maintenance and service 3014, or both in FIG. 30. The use of a number of the different illustrative embodiments may substantially expedite the assembly of aircraft 3100, reduce the cost of aircraft 3100, or both.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, or some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for disposing of waste 222 in aircraft 200. An apparatus comprises receptacle system 224. Receptacle system 224 is configured to hold waste 222. Receptacle system 224 is located in space 228 between galley 204 and bulkhead 208 of aircraft 200. In some examples, the apparatus also includes drawer system 226. Drawer system 226 is associated with galley structure 216 and is in communication with receptacle system 224. Drawer system 226 is configured to receive waste 222 and move waste 222 into receptacle system 224.

With receptacle system 224 positioned in space 228 between galley 204 and bulkhead 208, receptacle system 224 does not take up space in galley 204 that may be used for other items. For example, since receptacle system 224 is positioned behind galley 204, storage compartments 217 previously used for waste storage may now be used to store other items in galley 204.

Further, space 228 allows group of bins 230 in receptacle system 224 to be larger than some currently used systems. For instance, first bin 234 and second bin 236 may be configured to store about five cubic feet of waste 222 each. This configuration provides five times the storage capacity of some waste storage compartments currently used in aircraft that may hold about one cubic foot of waste each.

Drawer system 226 associated with galley structure 216 also provides a more convenient way to dispose of waste 222 than with waste storage compartments located in the lower portion of galley 204. Instead of bending down to place waste 222 in a waste storage compartment, flight crew 214 may place waste 222 in drawer system 226 on counter 218. When drawer system 226 is located on counter 218, drawer system 226 may be accessed during various stages of operation. As a result, flight crew 214 disposes of waste 222 throughout flight of aircraft 200 and gains access to receptacle system 224 when aircraft entry or access doors are closed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a receptacle system configured to hold waste, wherein the receptacle system is located in a space between a galley and a bulkhead of an aircraft; and
   a drawer system associated with a galley structure and in communication with the receptacle system and configured to receive the waste and move the waste into the receptacle system, wherein the drawer system comprises a compartment associated with the galley structure and having a first opening configured to receive the waste, a moveable barrier in a bottom of the compartment configured to move to expose a second opening such that the waste moves from the compartment through the second opening into the receptacle system, and an angled portion connected to the moveable barrier using a hinge such that the moveable barrier moves relative to the angled portion.

2. The apparatus of claim 1, wherein the compartment is moveable within the galley structure between an open position and a closed position such that the waste is received in the compartment through the first opening when the compartment is in the open position and the waste moves through the second opening into the receptacle system when the compartment is in the closed position with the moveable barrier moving to expose the second opening.

3. The apparatus of claim 2, wherein:
   the angled portion in the compartment is configured to move the waste toward the moveable barrier such that the waste received in the compartment through the first opening is moved through the second opening into the receptacle system when the moveable barrier moves to expose the second opening.

4. The apparatus of claim 3, wherein the moveable barrier comprises flexible tabs configured to be positioned above the receptacle system when the compartment is in the closed position.

5. The apparatus of claim 1, wherein the receptacle system comprises:
   a group of bins; and
   a deflector associated with the group of bins and configured to direct the waste into the group of bins.

6. The apparatus of claim 1, wherein the receptacle system is configured to be accessed using a group of doors located below the galley structure.

7. The apparatus of claim 1, wherein the waste is selected from at least one of trash, recyclable materials, liquid waste, or hazardous materials.

8. The apparatus of claim 1, wherein the bulkhead is an aft pressure bulkhead of a fuselage of the aircraft.

9. A method for disposing of waste in an aircraft, the method comprising:
   receiving the waste through a first opening in a compartment associated with a galley structure; and
   moving the waste from the compartment through a second opening into a receptacle system located in a space between a galley and a bulkhead of the aircraft using a drawer system in communication with the receptacle system by moving a moveable barrier in a bottom of the compartment to expose the second opening, wherein the drawer system comprises an angled portion connected to the moveable barrier using a hinge such that the moveable barrier moves relative to the angled portion.

10. The method of claim 9 further comprising:
    moving the waste toward the moveable barrier using the angled portion in the compartment such that the waste received in the compartment through the first opening is moved into the receptacle system when the moveable barrier moves to expose the second opening.

11. The method of claim 10 further comprising:
    moving the compartment within the galley structure between an open position and a closed position such that the waste is received in the compartment through the first opening when the compartment is in the open position and the waste moves through the second opening into the receptacle system when the compartment is in the closed position when the moveable barrier moves to expose the second opening.

12. The method of claim 9 further comprising:
    directing the waste into a group of bins in the receptacle system using a deflector.

13. An aircraft comprising:
    a galley in an aft section of a fuselage of the aircraft; and
    a waste disposal system associated with the galley and comprising a receptacle system having a group of bins configured to hold waste and a drawer system associated with a galley structure and in communication with the receptacle system, wherein the receptacle system is located in a space between the galley and an aft pressure bulkhead of the fuselage of the aircraft, and wherein the drawer system comprises a compartment associated with the galley structure and having a first opening configured to receive the waste, a moveable barrier in a bottom of the compartment configured to move to expose a second opening such that the waste moves from the compartment through the second opening into the receptacle system, and an angled portion in the compartment connected to the moveable barrier using a hinge such that the moveable barrier moves relative to the angled portion and configured to move the waste toward the moveable barrier such that the waste received in the compartment through the first opening is moved through the second opening into the receptacle system when the moveable barrier moves to expose the second opening.

14. The aircraft of claim 13, wherein the receptacle system comprises:
    a deflector associated with the group of bins and configured to direct the waste into the group of bins.

15. The aircraft of claim 13, wherein a first bin in the group of bins is configured to hold recyclable materials and a second bin in the group of bins is configured to hold trash.

16. The aircraft of claim 13, further comprising:
    a group of doors located below the galley structure and configured to open to provide access to the group of bins.

* * * * *